US009317148B2

(12) United States Patent
Arakawa et al.

(10) Patent No.: US 9,317,148 B2
(45) Date of Patent: Apr. 19, 2016

(54) DISPLAY INPUT DEVICE, AND IMAGE FORMING APPARATUS INCLUDING TOUCH PANEL PORTION

(71) Applicant: KYOCERA Document Solutions Inc., Osaka (JP)

(72) Inventors: Hiroki Arakawa, Osaka (JP); Yasuhiro Sekiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 266 days.

(21) Appl. No.: 13/853,962

(22) Filed: Mar. 29, 2013

(65) Prior Publication Data

US 2013/0271402 A1 Oct. 17, 2013

(30) Foreign Application Priority Data

Apr. 13, 2012 (JP) ................. 2012-091805

(51) Int. Cl.
*G06F 3/048* (2013.01)
*G06F 3/041* (2006.01)
*G06F 3/0484* (2013.01)
*G06F 3/01* (2006.01)
*G06F 3/0488* (2013.01)
*H04N 1/00* (2006.01)
(Continued)

(52) U.S. Cl.
CPC ............... *G06F 3/041* (2013.01); *G06F 3/017* (2013.01); *G06F 3/0488* (2013.01); *G06F 3/04842* (2013.01); *H04N 1/00432* (2013.01); *H04N 1/00472* (2013.01); *H04N 1/00474* (2013.01); *H04N 1/00482* (2013.01); *G06F 3/0486* (2013.01); *G06F 3/04817* (2013.01); *G06F 2203/04808* (2013.01); *H04N 2201/0094* (2013.01)

(58) Field of Classification Search
CPC .......... G06F 2203/04808; G06F 3/017; G06F 3/04842; G06F 3/0482; G06F 3/0486; G06F 3/04817
See application file for complete search history.

(56) References Cited

U.S. PATENT DOCUMENTS

2002/0059288 A1 5/2002 Yagi et al.
2004/0104894 A1* 6/2004 Tsukada et al. ............... 345/168
(Continued)

FOREIGN PATENT DOCUMENTS

JP 2000056885 A 2/2000
JP 2001356878 A 12/2001
JP 2012505466 A 3/2012

*Primary Examiner* — Michael J Eurice
(74) *Attorney, Agent, or Firm* — Alleman Hall McCoy Russell & Tuttle LLP

(57) ABSTRACT

A display input device includes a display portion and a touch panel portion. The display portion displays a screen having an object thereon. The touch panel portion is provided on the display portion and detects a plurality of touched positions touched by a user. The display portion, while displaying the screen having the object thereon, when an operation of touching two points on the touch panel portion has been performed, displays transfer destination information indicating a transfer destination candidate that can be a transfer destination of the object. The touch panel portion, when an object transfer operation including an operation of touching a display position of the transfer destination information and then releasing the touched state has been performed, accepts that the transfer destination candidate corresponding to the transfer destination information displayed at the last touched position has been determined as an actual transfer destination of the object.

6 Claims, 20 Drawing Sheets

(51) Int. Cl.
　　*G06F 3/0481*　　(2013.01)
　　*G06F 3/0486*　　(2013.01)

(56) References Cited

U.S. PATENT DOCUMENTS

2005/0104867 A1* 5/2005 Westerman et al. .......... 345/173
2007/0198947 A1* 8/2007 Cox et al. ...................... 715/786
2008/0036743 A1* 2/2008 Westerman et al. .......... 345/173
2008/0168403 A1* 7/2008 Westerman et al. .......... 715/863
2009/0102809 A1* 4/2009 Mamba et al. ................ 345/173
2010/0090971 A1* 4/2010 Choi et al. .................... 345/173
2011/0185321 A1* 7/2011 Capela et al. ................. 715/863
2011/0302519 A1* 12/2011 Fleizach et al. .............. 715/773
2012/0030569 A1* 2/2012 Migos et al. .................. 715/702

* cited by examiner

DISPLAY INPUT DEVICE, AND IMAGE FORMING APPARATUS INCLUDING TOUCH PANEL PORTION

INCORPORATION BY REFERENCE

This application is based upon and claims the benefit of priority from the corresponding Japanese Patent Application No. 2012-091805 filed on Apr. 13, 2012, the entire contents of which are incorporated herein by reference.

BACKGROUND

The present disclosure relates to a display input device and an image forming apparatus including the display input device.

Conventionally, an image forming apparatus is known that has a plurality of types of functions such as a copy function, a scan function, and a fax function. In general, the image forming apparatus includes a display input device that accepts an instruction to select a function to be used among a plurality of types of functions, an instruction to perform setting of the function to be used, and the like.

The display input device of the image forming apparatus may have provided thereon, besides a hardware key and the like, a display portion with a touch panel, on which a software key is displayed. Such a display input device displays software keys for accepting various settings on the display portion, and detects a software key touched via the touch panel, based on the output from the touch panel.

When a function to be used is selected among the plurality of types of functions, the display input device displays a setting screen corresponding to the selected function. For example, when the copy function is selected, the display input device displays a setting screen of the copy function, and thereafter, when the scan function is selected, the display input device switches the display screen from the setting screen of the copy function to a setting screen of the scan function. Thus, a user can perform setting about the selected functions.

In addition, conventionally, a display input device is known that is capable of pasting an object (for example, an electronic label or the like) created by a user on a setting screen of each function. Here, some users may desire to transfer an object pasted on a certain setting screen to another setting screen. In order to meet such a user's demand, the display input device may be configured to accept an instruction to transfer an object from a user.

For example, in a conventional object transfer method, in order to transfer an object (file icon), a user touches two points at a display position of the object to be transferred. Then, the user performs an operation for shifting to an object transfer mode (a mode that allows the user to transfer the object). Here, a transfer key is provided as a software key on the display screen, and the user can shift to the object transfer mode by touching the display position of the transfer key. After shifting to the object transfer mode, the user touches two points at a display position of an object (folder icon) to be a transfer destination, on the touch panel. In response to this operation, a control portion of the display input device determines, as a transfer destination, the object displayed at the position where two points are touched, and transfers the object to be transferred, to the object that is a transfer destination.

SUMMARY

A display input device according to one aspect of the present disclosure includes a display portion and a touch panel portion. The display portion displays a screen on which an object is provided. The touch panel portion is provided on the display portion and detects a plurality of touched positions that a user is touching. Further, the display portion, while displaying the screen on which the object is provided, when an operation of touching two points on the touch panel portion has been performed, displays transfer destination information indicating a transfer destination candidate that can be a transfer destination of the object. In addition, the touch panel portion, when an object transfer operation including an operation of touching a display position of the transfer destination information and then releasing the touched state has been performed, accepts that the transfer destination candidate corresponding to the transfer destination information displayed at the last touched position has been determined as an actual transfer destination of the object.

An image forming apparatus according to another aspect of the present disclosure includes a display portion and a touch panel portion. The display portion displays a screen on which an object is provided. The touch panel portion is provided on the display portion and detects a plurality of touched positions that a user is touching. Further, the display portion, while displaying the screen on which the object is provided, when an operation of touching two points on the touch panel portion has been performed, displays transfer destination information indicating a transfer destination candidate that can be a transfer destination of the object. In addition, the touch panel portion, when an object transfer operation including an operation of touching a display position of the transfer destination information and then releasing the touched state has been performed, accepts that the transfer destination candidate corresponding to the transfer destination information displayed at the last touched position has been determined as an actual transfer destination of the object.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 10 is a diagram showing a screen displayed on the display input device of the image forming apparatus shown in FIG. 1 when an object (electronic label) is provided on the screen.

FIG. 17 is a diagram illustrating an operation for transferring an object and a screen displayed upon the operation, on the display input device of the image forming apparatus shown in FIG. 1.

DETAILED DESCRIPTION

[Entire Configuration of Image Forming Apparatus]

Hereinafter, an image forming apparatus (multifunction peripheral) capable of executing a plurality of types of functions such as a copy function, a transmission (scan) function, a fax function, and a box function will be described as an example. It is noted that the box function is a function of storing image data in a storage area (for example, a folder provided in a storage portion 113 described later) referred to as a box registered in advance, thereby allowing printing based on the stored image data.

Figure 1:
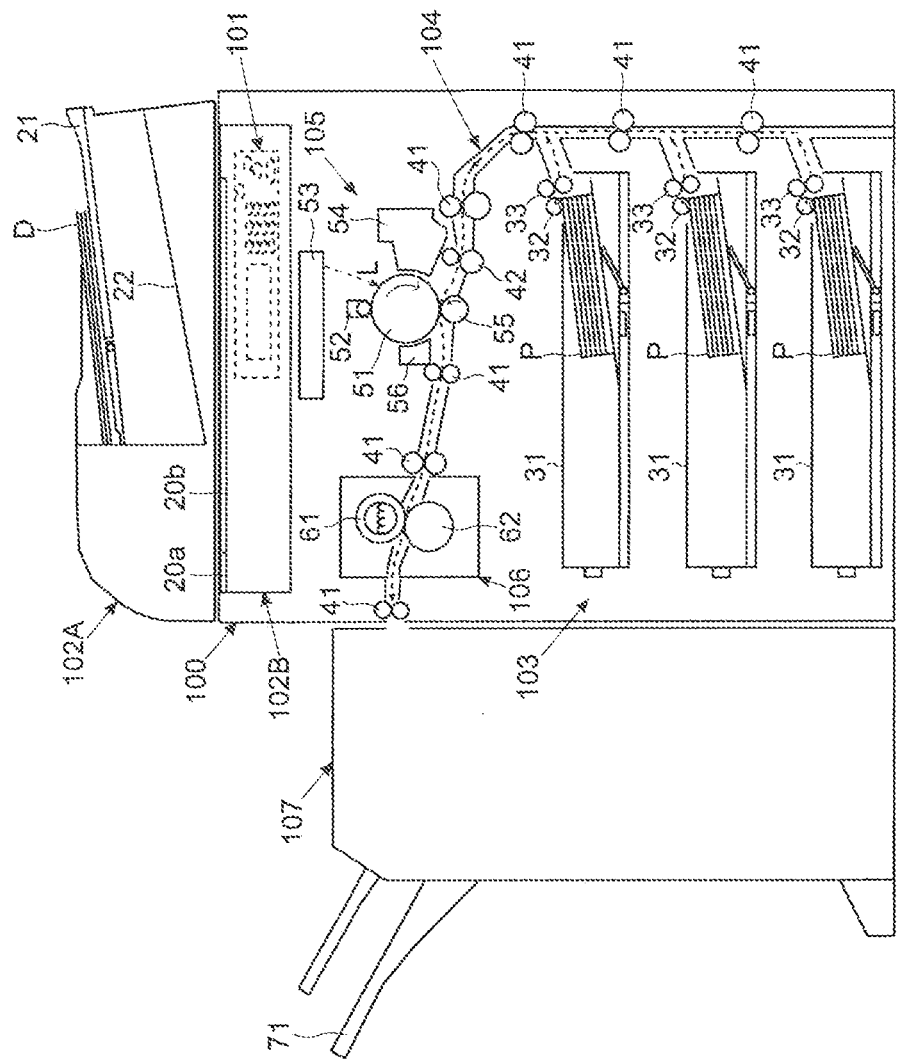
FIG. 1 is a schematic diagram of an image forming apparatus including a display input device according to an embodiment of the present disclosure.

As shown in FIG. 1, an image forming apparatus 100 of the present embodiment includes an operation panel 101 (corresponding to a "display input device"), a document sheet conveying portion 102A, an image reading portion 102B, a sheet feed portion 103, a paper sheet conveying portion 104, an image forming portion 105, a fixing portion 106, a post-processing portion 107, and the like.

Figure 2:
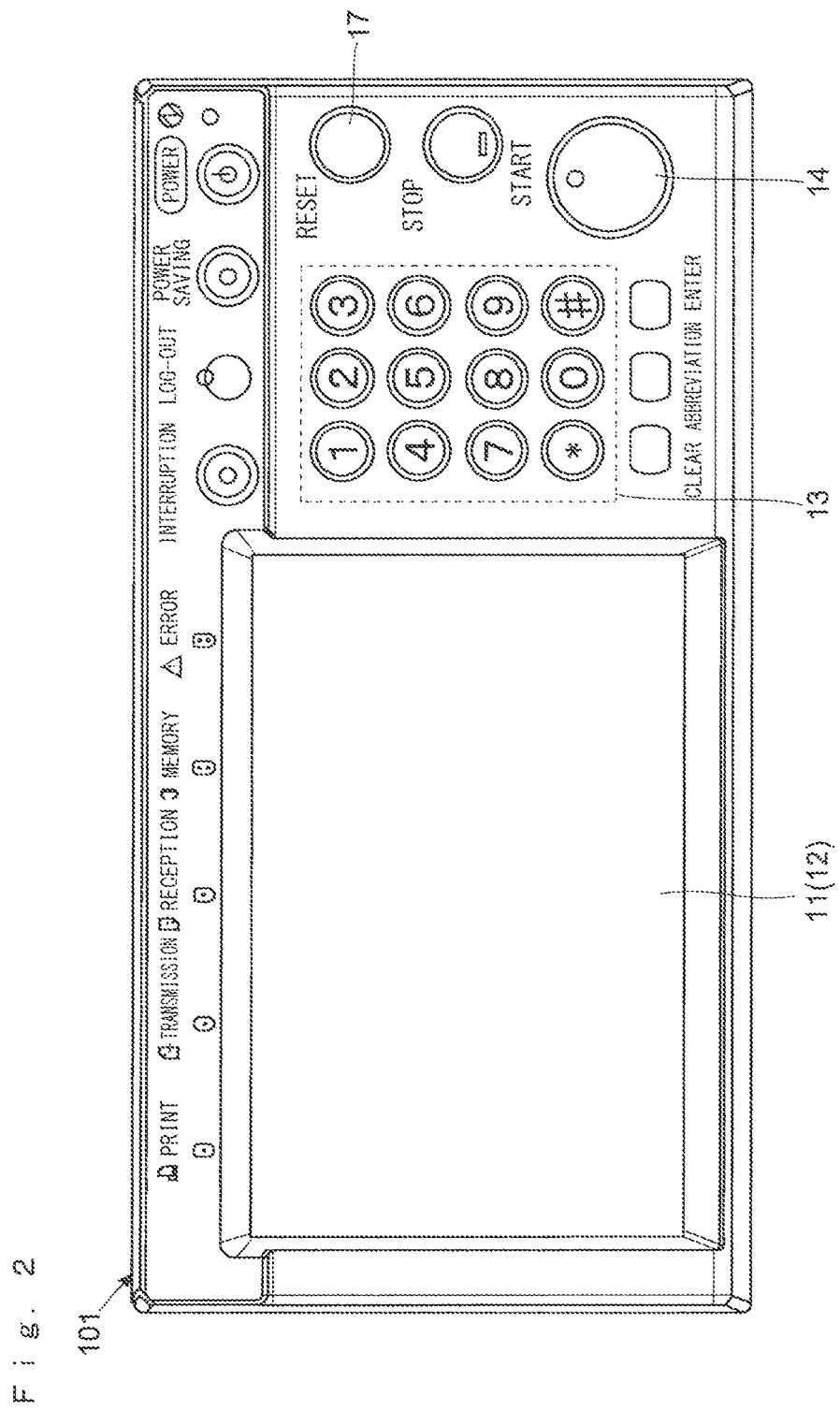
FIG. 2 is a detail diagram of the display input device of the image forming apparatus shown in FIG. 1.

The operation panel 101 is, for example, provided on the front surface side of the apparatus. As shown in FIG. 2, the operation panel 101 has a liquid crystal display portion 12 (corresponding to a "display portion"). A touch panel portion 11 is provided on the display surface of the liquid crystal display portion 12. The touch panel portion 11 is a multi-touch panel capable of, when a user has touched a plurality of positions on the display surface of the liquid crystal display portion 12, detecting the plurality of touched positions at the same time. The liquid crystal display portion 12 displays a screen on which, for example, a message and/or a software key that accepts an input operation (touching operation) from a user are provided. It is noted that the screen displayed on the liquid crystal display portion 12 will be described later in detail. The touch panel portion 11 covering the display surface of the liquid crystal display portion 12 is provided for detecting a software key designated by a user (a software key touched by a user via the touch panel portion 11). In addition, the operation panel 101 has provided thereon hardware keys such as a numeric keypad 13 that accepts a numeric input and/or a start key 14 that accepts an instruction to start function execution.

Returning to FIG. 1, the document sheet conveying portion 102A is openable and closable via a rotation shaft (not shown) provided on the apparatus back surface side of the image reading portion 102B. The document sheet conveying portion 102A draws a document sheet D set on a document sheet set tray 21, causes the document sheet D to pass on conveying reading contact glass 20a, and discharges the document sheet D to the document sheet discharge tray 22. In addition, the document sheet conveying portion 102A also has a function of pressing the document sheet D placed on placement reading contact glass 20b.

The image reading portion 102B reads the document sheet D to generate image data. In the image reading portion 102B, optically-relevant members such as an exposure lamp, a mirror, a lens, and an image sensor are provided though not shown. The image reading portion 102B radiates light onto the document sheet D passing on the conveying reading contact glass 20a or the document sheet D placed on the placement reading contact glass 20b. Then, the image reading portion 102B performs A/D conversion for an output value of the image sensor receiving light reflected from the document sheet D, thereby generating image data. Thus, the image forming apparatus 100 can perform printing based on the image data obtained by a reading operation (scanning) of the document sheet D performed by the image reading portion 102B. In addition, the image forming apparatus 100 can also store the image data obtained by the scanning.

The sheet feed portion 103 has a plurality of cassettes 31 which contain paper sheets P, and supplies the paper sheets P contained in the plurality of cassettes 31 to the paper sheet conveying portion 104. In the sheet feed portion 103, pick-up rollers 32 that draw the contained paper sheets P, and separation roller pairs 33 that prevent the paper sheets P from being conveyed redundantly are provided.

The paper sheet conveying portion 104 conveys the paper sheet P inside the image forming apparatus 100. Specifically, the paper sheet P supplied from the sheet feed portion 103 is conveyed by the paper sheet conveying portion 104, whereby the paper sheet P passes through the image forming portion 105 and the fixing portion 106 in this order. In the paper sheet conveying portion 104, a plurality of conveying roller pairs 41 that convey the paper sheet P are provided. Further, in the paper sheet conveying portion 104, a registration roller pair 42 is also provided that causes the paper sheet P to stand by just before the image forming portion 105 and conveys the paper sheet P to the image forming portion 105 at a predetermined timing.

The image forming portion 105 forms a toner image based on image data, and transfers the toner image onto the paper sheet P. The image forming portion 105 includes a photosensitive drum 51, a charging device 52, an exposure device 53, a developing device 54, a transfer roller 55, a cleaning device 56, and the like.

In a forming process of a toner image and a transfer process of the toner image, first, the photosensitive drum 51 is rotationally driven, and the surface of the photosensitive drum 51 is charged at a predetermined potential by the charging device 52. In addition, the exposure device 53 outputs a light beam L based on image data, thereby scanning and exposing the surface of the photosensitive drum 51 with the light beam L. Thus, an electrostatic latent image is formed on the surface of the photosensitive drum 51. The developing device 54 supplies toner to the electrostatic latent image formed on the surface of the photosensitive drum 51, thereby developing an image.

The transfer roller 55 can be rotated while pressing the surface of the photosensitive drum 51. Further, a predetermined voltage is applied to the transfer roller 55. In this state, the registration roller pair 42 causes the paper sheet P to proceed between the transfer roller 55 and the photosensitive drum 51 at a predetermined timing. Thus, the toner image on the surface of the photosensitive drum 51 is transferred onto the paper sheet P. Then, after the transfer process of the toner image is finished, the cleaning device 56 eliminates residual toner on the surface of the photosensitive drum 51.

The fixing portion 106 heats and pressurizes the toner image transferred onto the paper sheet P, thereby fixing the toner image on the paper sheet P. The fixing portion 106 includes a fixing roller 61 having a heat generation source, and a pressure roller 62 to be pressed to the fixing roller 61. The paper sheet P on which the toner image has been transferred passes between the fixing roller 61 and the pressure roller 62, whereby the paper sheet P is heated and pressed. Thus, the toner image is fixed on the paper sheet P, and the printing is completed.

The post-processing portion 107 receives the printed paper sheet P from the fixing portion 106, and performs post-processing such as sorting processing, stapling processing, and punching processing, for the paper sheet P. Then, after performing the post-processing for the printed paper sheet P, the post-processing portion 107 discharges the paper sheet P to a discharge tray 71.

[Hardware Configuration of Image Forming Apparatus]

Figure 3:
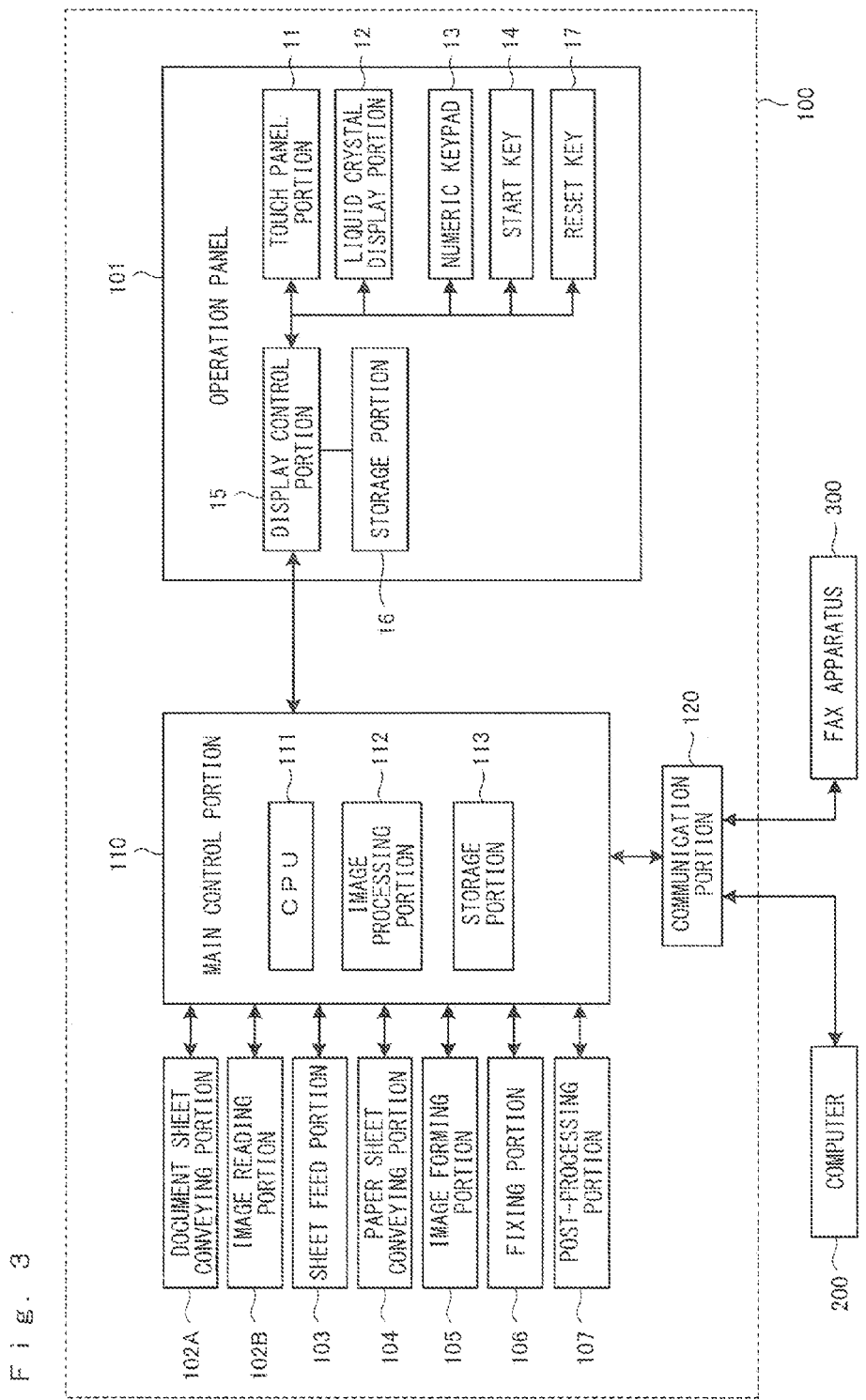
FIG. 3 is a block diagram showing the hardware configuration of the image forming apparatus shown in FIG. 1.

The image forming apparatus 100 includes a main control portion 110 as shown in FIG. 3. The main control portion 110 includes a CPU 111 which is a central processing unit, an image processing portion 112, and a storage portion 113. The image processing portion 112 has a dedicated ASIC for image processing, a memory, and the like, and performs various image processes (such as expansion/reduction, density conversion, and data form conversion) for image data. The storage portion 113 has a ROM, a RAM, an HDD, and the like. For example, a program and data needed for executing a function are stored in the ROM, and the program and the data are expanded on the RAM.

The main control portion 110 is connected to the document sheet conveying portion 102A, the image reading portion 102B, the sheet feed portion 103, the paper sheet conveying portion 104, the image forming portion 105, the fixing portion 106, the post-processing portion 107, and the like. The main control portion 110 performs overall control, image processing control, driving control for a motor that rotates each rotational body, and the like, based on the program and the data stored in the storage portion 113.

The operation panel 101 is also connected to the main control portion 110. The operation panel 101 includes a display control portion 15 connected to the main control portion 110. The display control portion 15 has a CPU and the like, and receives an instruction from the main control portion 110, to control the display operation of the operation panel 101. For example, when a user has touched a software key displayed on the liquid crystal display portion 12 via the touch panel portion 11, the display control portion 15 detects the coordinates of the touched position based on the output of the touch panel portion 11. That is, the display control portion 15 detects the software key touched via the touch panel portion 11 by the user (the software key designated by the user). A storage portion 16 is connected to the display control portion 15. Data indicating the correspondence between the output of the touch panel portion 11 and the coordinates of the touched positions is stored in the storage portion 16. As another embodiment, it is conceivable that the main control portion 110 also has the function of the display control portion 15 of the operation panel 101 so that the main control portion 110 controls the touch panel portion 11, the liquid crystal display portion 12, and the like.

In addition, the main control portion 110 is connected to a communication portion 120. The communication portion 120 is, for example, connected in a communicable manner to an external computer 200 via a network. Thus, the image forming apparatus 100 can perform printing based on image data transmitted from the computer 200, and also transmit image data obtained by scanning to the computer 200. In addition, the communication portion 120 may have a modem, and in this case, the image forming apparatus 100 can perform fax communication with an external fax apparatus 300 via a network such as a telephone line.

[Display Screen of Operation Panel]

Figure 4:
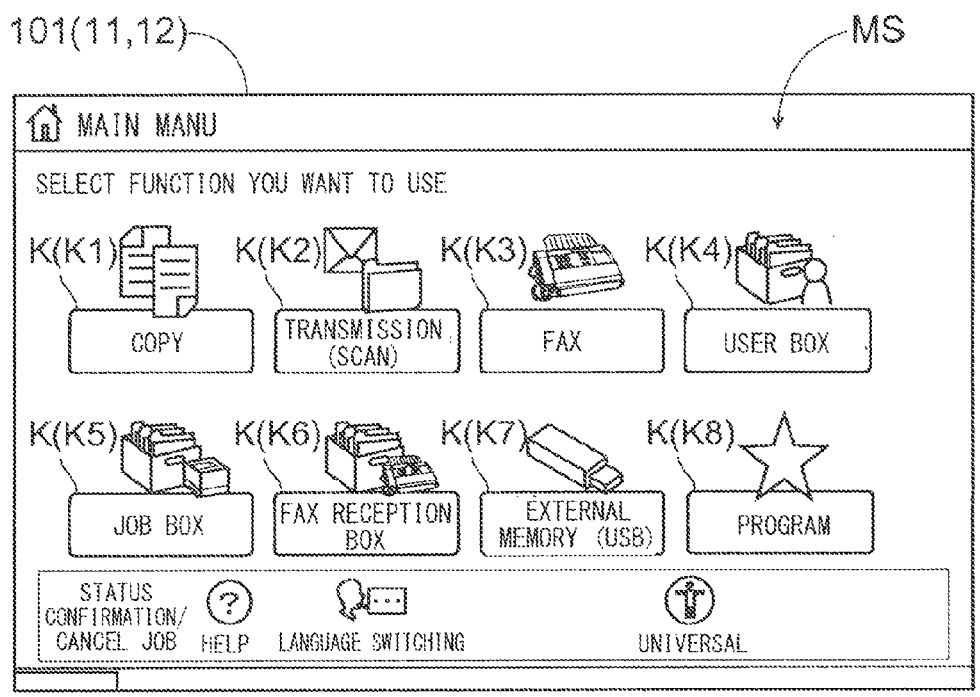
FIG. 4 is a diagram showing an example of a screen (main menu screen) displayed on the display input device of the image forming apparatus shown in FIG. 1.

When the main power supply of the operation panel 101 is turned on, the operation panel 101 displays, as an initial screen, a main menu screen MS as shown in FIG. 4. On the main menu screen MS, a plurality of software keys K respectively corresponding to a plurality of types of functions are provided for accepting, from a user, an instruction to select a function to be used among a plurality of functions.

On the main menu screen MS, when a user has designated a function to be used, the operation panel 101 displays a setting screen (for example, screens shown in FIGS. 5 to 8) that accepts instructions such as a setting instruction about the designated function. Specifically, when a display position of one of the plurality of software keys K is touched via the touch panel portion 11 by a user, the operation panel 101 displays a setting screen that accepts instructions such as a setting instruction about a function corresponding to the software key K.

Figure 5:
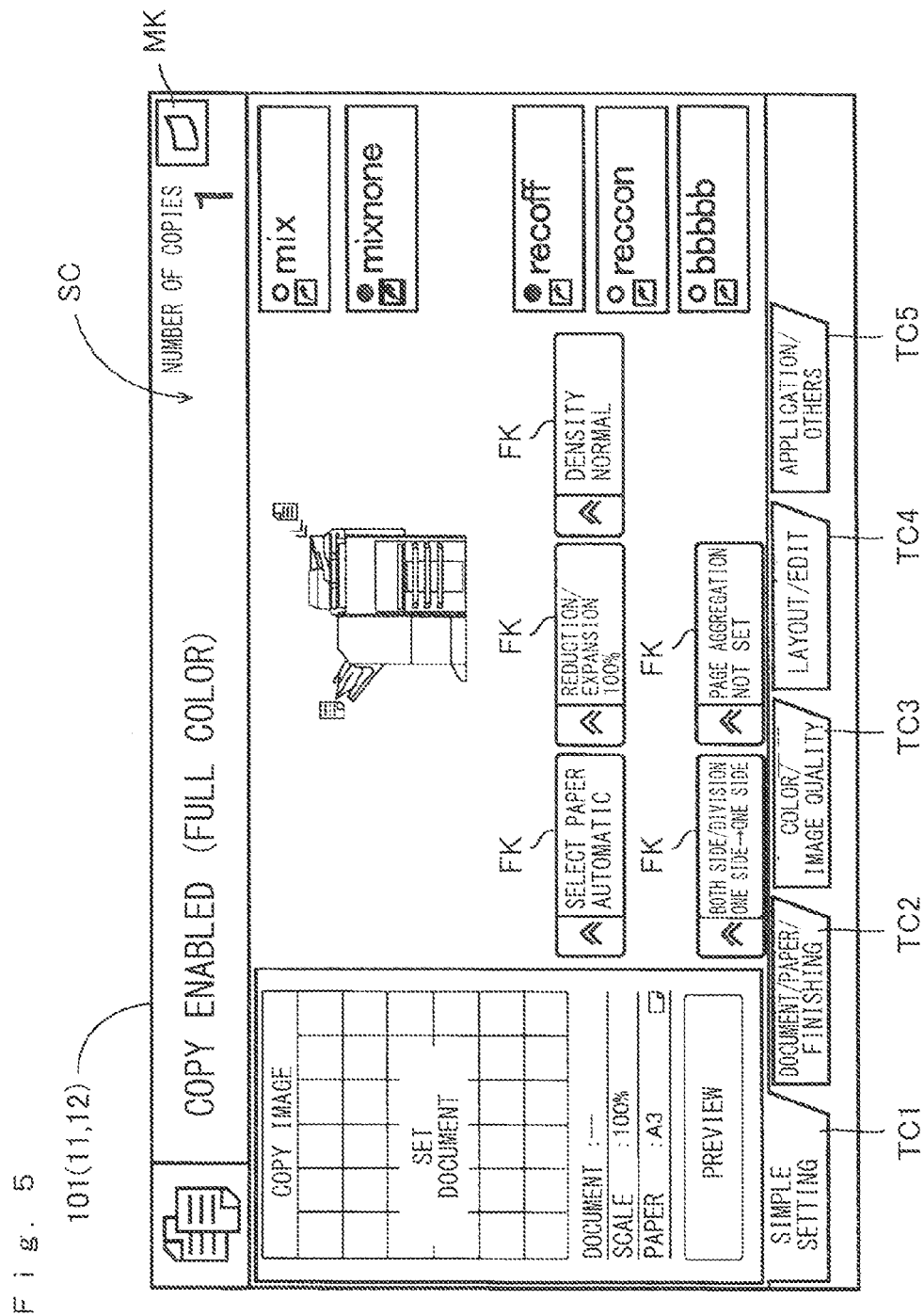
FIG. 5 is a diagram showing an example of a screen (setting screen of a copy function) displayed on the display input device of the image forming apparatus shown in FIG. 1.

For example, when a display position of a software key K1 is touched via the touch panel portion 11 by a user, the operation panel 101 displays a setting screen SC that accepts a setting instruction for a copy function, as shown in FIG. 5. On the setting screen SC of the copy function, a plurality of setting keys FK respectively corresponding to a plurality of setting items about the copy function, are provided. FIG. 5 shows the setting screen SC on which, as an example, a plurality of setting keys FK respectively corresponding to setting items of paper selection, reduction/expansion, density, both side/division, and page aggregation are provided. On the plurality of setting keys FK, the current setting values of the corresponding setting items are indicated. When one of the plurality of setting keys FK is touched and designated via the touch panel portion 11 by a user, the operation panel 101 displays, for example, a screen (not shown) that allows the user to input the setting value of the setting item corresponding to the designated setting key FK. Thus, the user can recognize the current setting values of the plurality of setting items about the copy function, and can change each setting value.

On the setting screen SC, a plurality of tab keys TC1 to TC5 are provided. When a display position of one of the tab keys TC1 to TC5 is touched and designated by a user via the touch panel portion 11, the operation panel 101 displays a setting screen that accepts a setting instruction for a setting item associated with the display position of the designated tab key. For example, the setting screen SC shown in FIG. 5 is a setting screen that accepts a setting instruction for a setting item associated with the display position of the tab key TC1. Then, after the operation panel 101 has displayed the setting screen SC shown in FIG. 5, when one of the other tab keys TC2 to TC5 is designated, the operation panel 101 switches the display screen. That is, the operation panel 101 displays a setting screen that accepts a setting instruction for a setting item associated with the display position of the designated tab key.

Figure 6:
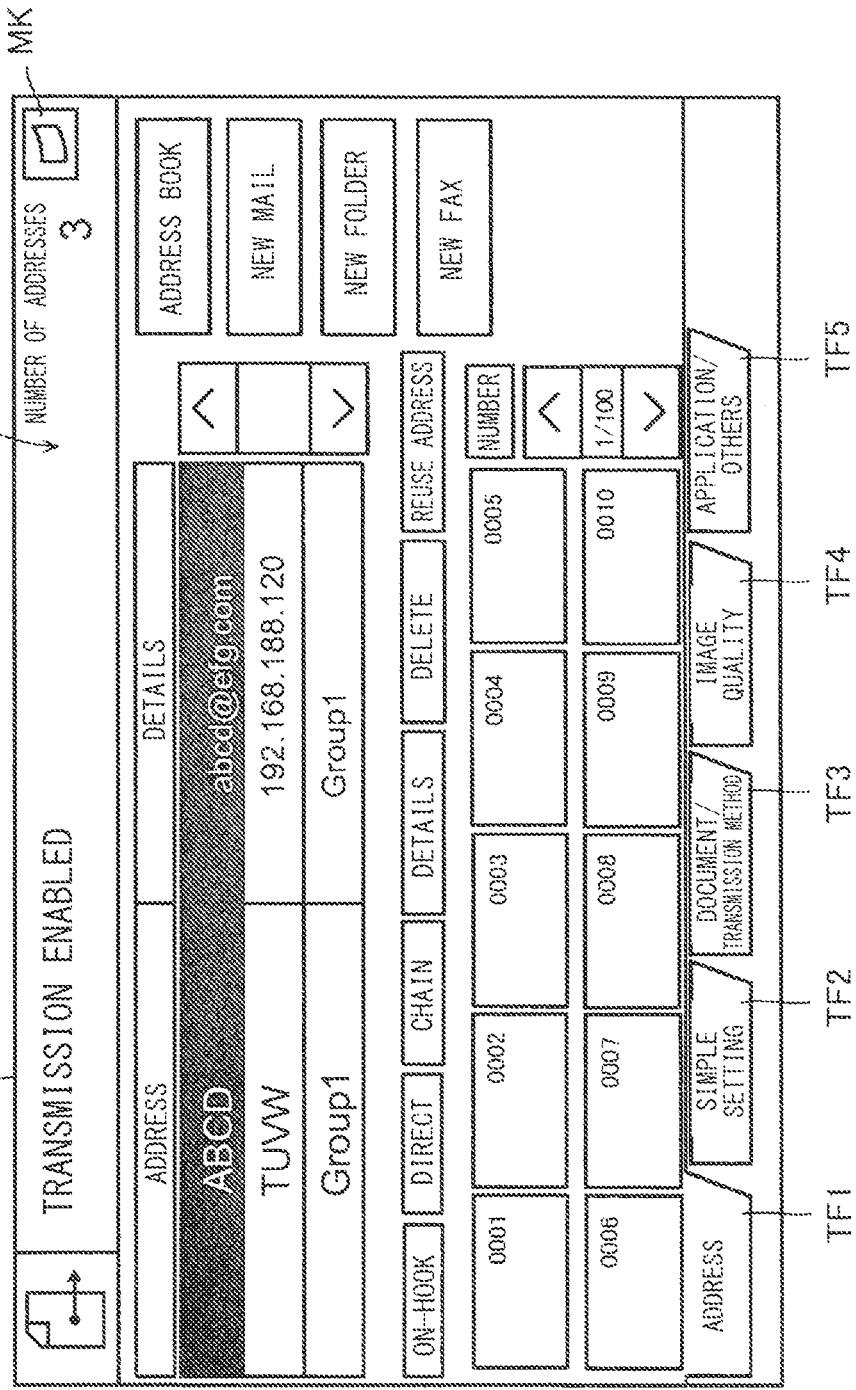
FIG. 6 is a diagram showing an example of a screen (setting screen of a transmission (scan) function) displayed on the display input device of the image forming apparatus shown in FIG. 1.

In addition, when a display position of a software key K2 (see FIG. 4) is touched via the touch panel portion 11 by a user, the operation panel 101 displays a setting screen SS that accepts a setting instruction for the transmission (scan) function, as shown in FIG. 6. On the setting screen SS of the transmission (scan) function, the user can perform an operation such as designation of a transmission destination (storage location) of image data obtained by scanning. For example, on the setting screen SS of the transmission (scan) function, information about transmission destinations to which the image data can be transmitted is displayed on a destination by destination basis. Then, when one of the transmission destinations is designated, the operation panel 101 inverts the display color of an information indication row of the designated transmission destination.

Also on the setting screen SS of the transmission (scan) function, a plurality of tab keys TS1 to TS5 are provided. For example, when the tab key TS1 of "address" is designated, the operation panel 101 displays the setting screen SS shown in FIG. 6, and when one of the other tab keys TS2 to TS5 is designated, the operation panel 101 displays a setting screen that accepts a setting instruction for a setting item associated with a display position of the designated tab key.

Figure 7:
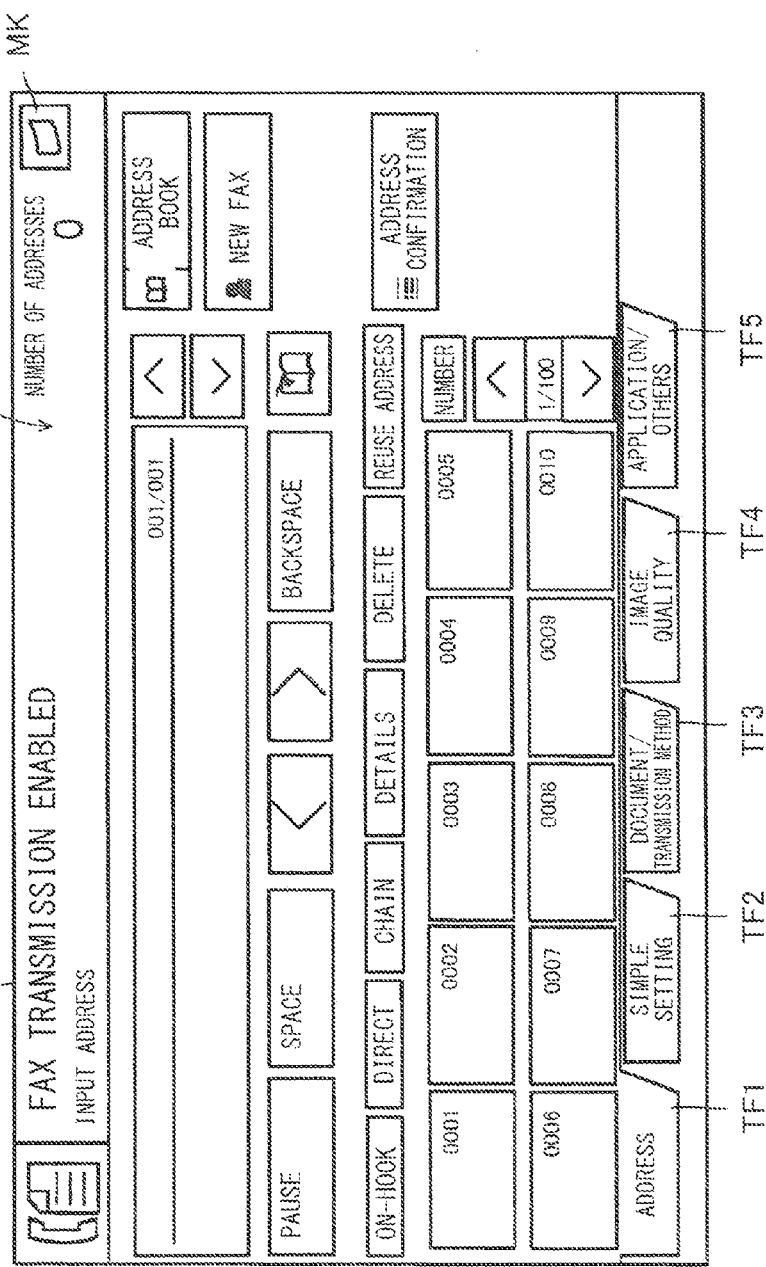
FIG. 7 is a diagram showing an example of a screen (setting screen of a fax function) displayed on the display input device of the image forming apparatus shown in FIG. 1.

In addition, when a display position of a software key K3 (see FIG. 4) is touched via the touch panel portion 11 by a user, the operation panel 101 displays a setting screen SF that accepts a setting instruction for the fax function, as shown in FIG. 7. On the setting screen SF of the fax function, the user can perform an operation such as input of a fax number. For example, on the setting screen SF of the fax function, a number indication row that indicates an inputted fax number is provided. When a fax number is inputted, the operation panel 101 displays the inputted fax number on the number indication row.

Also on the setting screen SF of the fax function, a plurality of tab keys TF1 to TF5 are provided. For example, when the tab key TF1 of "address" is designated, the operation panel 101 displays the setting screen SF shown in FIG. 7, and when one of the other tab keys TF2 to TF5 is designated, the operation panel 101 displays a setting screen that accepts a setting instruction for a setting item associated with a display position of the designated tab key.

Figure 8:
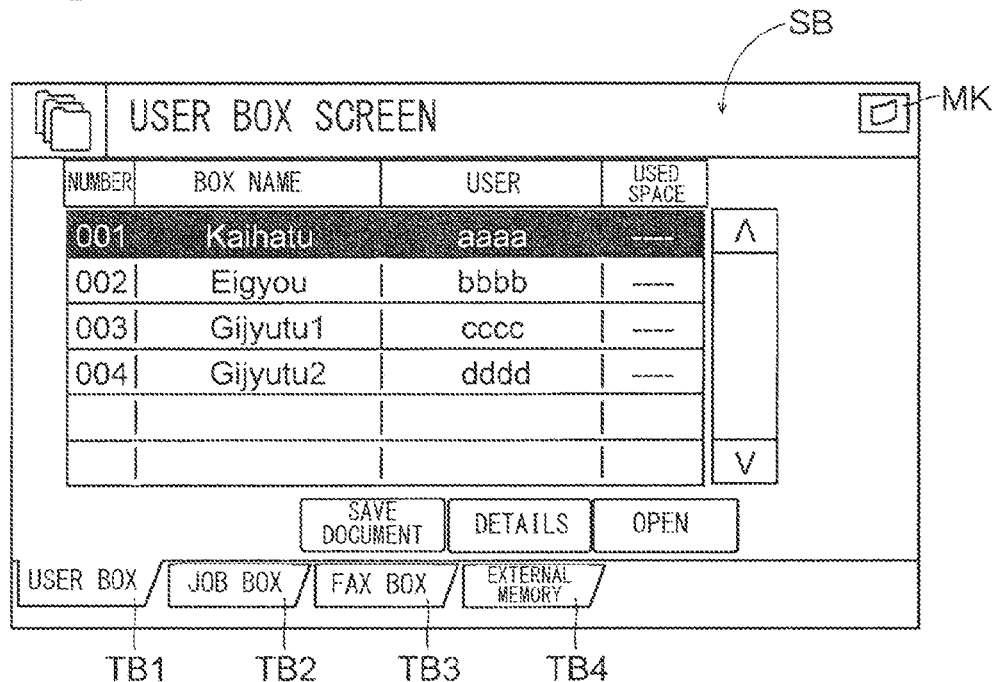
FIG. 8 is a diagram showing an example of a screen (setting screen of a box function) displayed on the display input device of the image forming apparatus shown in FIG. 1.

In addition, when a display position of a software key K4 (see FIG. 4) is touched via the touch panel portion 11 by a user, the operation panel 101 displays a setting screen SB that accepts a setting instruction for a user box function which is one of the box functions, as shown in FIG. 8. It is noted that the user box function is a function of storing image data obtained by scanning, thereby allowing printing based on the stored image data.

On the setting screen SB of the user box function, a user can perform an operation such as designation of a box to be used. For example, on the setting screen SB of the user box function, information about boxes having been already registered is displayed on a box by box basis. When one of the boxes is designated, the operation panel 101 inverts the display color of an information indication row of the designated box.

Also on the setting screen SB of the user box function, a plurality of tab keys TB1 to TB4 are provided. For example, the tab key TB1 is associated with the user box function. When the tab key TB1 is designated, the operation panel 101 displays the setting screen SB of the user box function shown in FIG. 8.

The tab keys TB2 and TB3 are respectively associated with a job box function and a fax box function each of which is one of the box functions. That is, when the tab key TB2 is designated, the operation panel 101 displays a setting screen of the job box function, and when the tab key TB3 is designated, the operation panel 101 displays a setting screen of the fax box function. It is noted that the job box function is a function of storing image data transmitted from the computer 200 to the image forming apparatus 100, thereby allowing printing based on the stored image data. In addition, the fax box function is a function of storing fax data received by the communication portion 120, thereby allowing printing based on the stored fax data.

The tab key TB4 is associated with a function (hereinafter, referred to as an external memory function) utilizing an external memory. When the tab key TB4 is designated, the operation panel 101 displays a setting screen of the external memory function. It is noted that the external memory function is a function of allowing printing based on image data stored in the external memory and/or allowing image data to be stored in the external memory.

In addition, it is also possible to shift from the main menu screen MS shown in FIG. 4 to each of the setting screens corresponding to the job box function, the fax box function, and the external memory function. That is, when the software key K5 is designated, the operation panel 101 shifts the display screen to the setting screen of the job box function; when the software key K6 is designated, the operation panel 101 shifts the display screen to the setting screen of the fax box function; and when the software key K7 is designated, the operation panel 101 shifts the display screen to the setting screen of the external memory function.

It is noted that a software key K8 is a software key K corresponding to the program function. When a display position of the software key K8 is touched via the touch panel portion 11 by a user, the operation panel 101 displays a program selection screen (not shown) that accepts, from a user, an instruction to select a program to be called among registered programs. It is noted that the program function is a function of registering, as a program, one or more setting items (setting values) selected in advance by a user among a plurality of setting items about functions such as the copy function and/or the transmission (scan) function.

[Creation of Object]

The operation panel 101 according to the present embodiment can display an object OB (see FIG. 10) such as an electronic label created by a user, so as to be overlaid on the setting screen of each function. For example, on the setting screen of each function, as shown in FIGS. 5 to 8, a creation key MK that accepts an instruction to create an object OB to be displayed so as to be overlaid on the setting screen, is provided. It is noted that a hardware key corresponding to the creation key MK may be provided on the operation panel 101.

Figure 9:
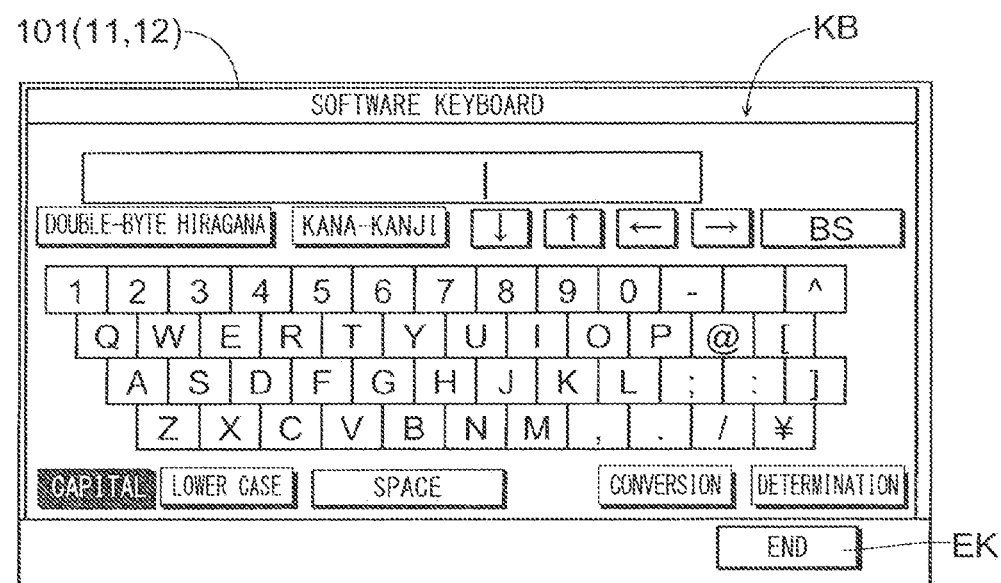
FIG. 9 is a diagram showing an example of a screen (screen on which a software keyboard for creating an object (electronic label) is provided) displayed on the display input device of the image forming apparatus shown in FIG. 1.
Figure 10:
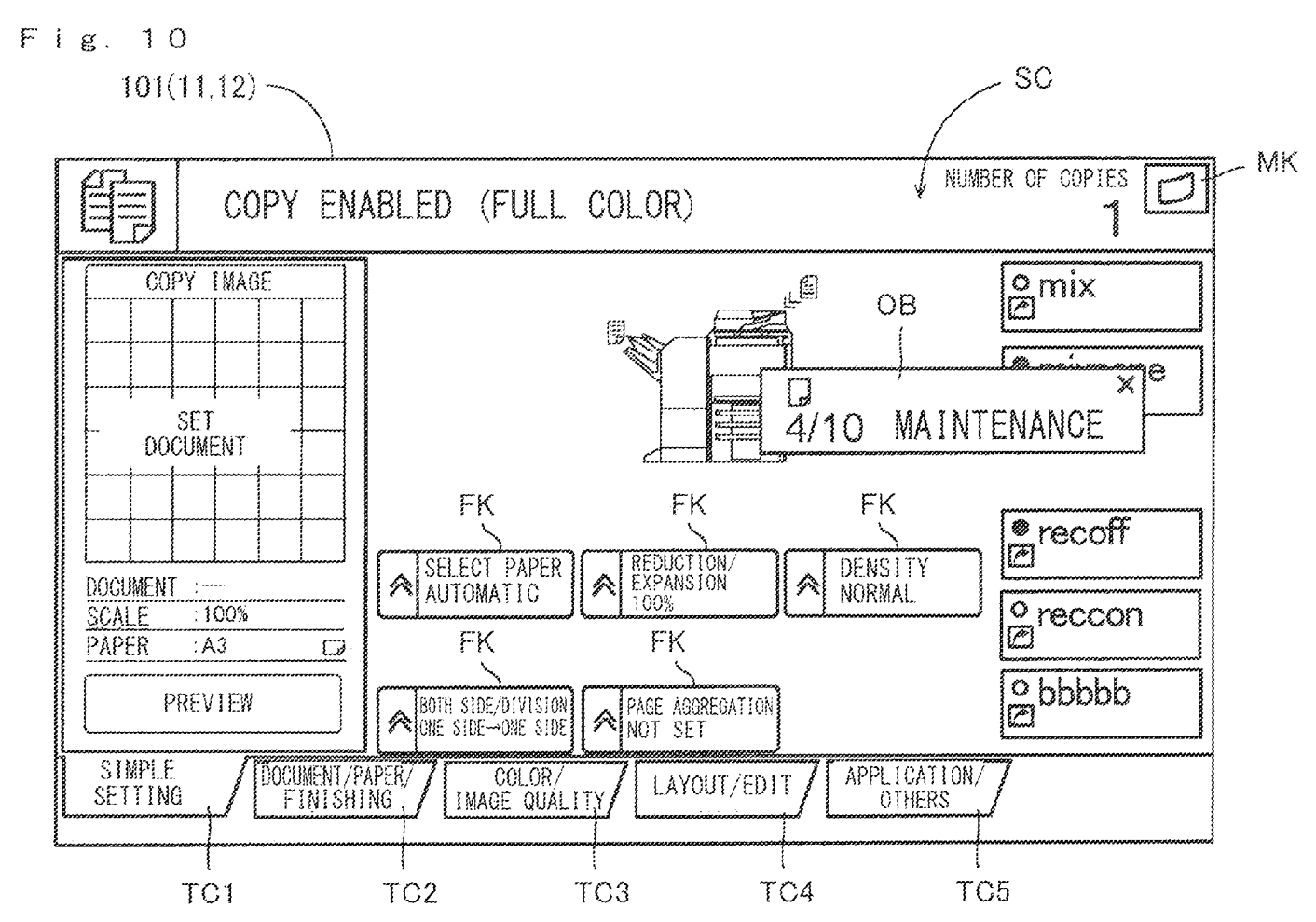

When a display position of the creation key MK is touched by a user via the touch panel portion 11, the operation panel 101 displays a software keyboard KB that accepts an input of a character (including a number, a special symbol, etc.) to be indicated on the object OB, as shown in FIG. 9. Thus, the user can input a message to be indicated on the object OB. Then, after inputting a desired message, the user touches a display position of an end key EK via the touch panel portion 11. In response to this operation, the operation panel 101 displays the object OB indicating the message inputted by the user so as to be overlaid on the setting screen, as shown in FIG. 10. It is noted that FIG. 10 shows the case where the object OB is displayed being overlaid on the setting screen SC of the copy function.

[Transfer of Object]

The operation panel 101 according to the present embodiment can move an object OB displayed being overlaid on a certain setting screen, to another setting screen. Here, transfer of an object OB includes the case of transferring (copying and pasting) a duplicate of the object OB to be transferred while leaving the object OB at the original position, and the case of cutting and transferring (cutting and pasting) the object OB to be transferred. Hereinafter, the case of transferring an object OB displayed being overlaid on the setting screen SC shown in FIG. 10 will be described as an example.

Figure 11:
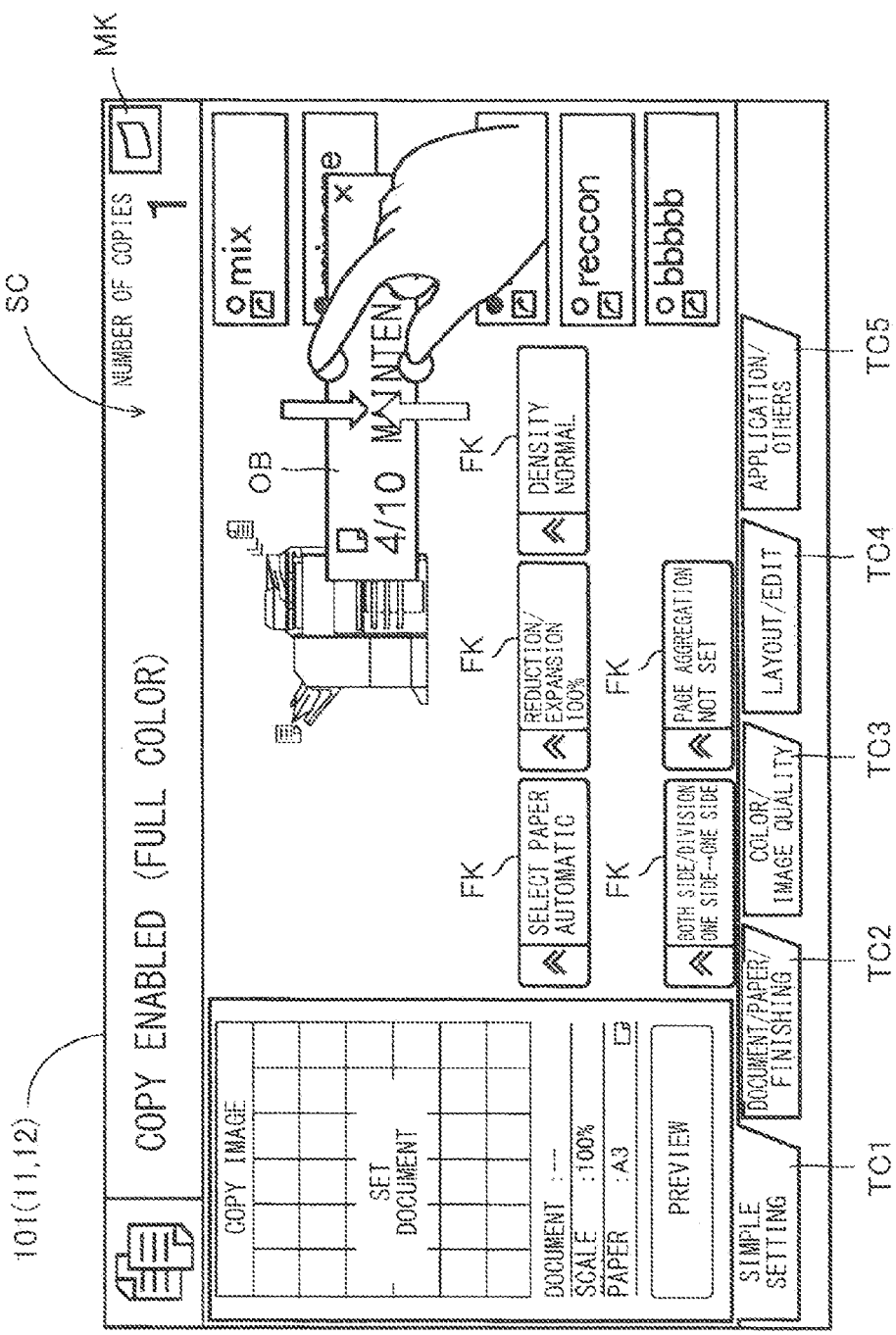
FIG. 11 is a diagram illustrating an operation for transferring an object and a screen displayed upon the operation, on the display input device of the image forming apparatus shown in FIG. 1.
Figure 12:
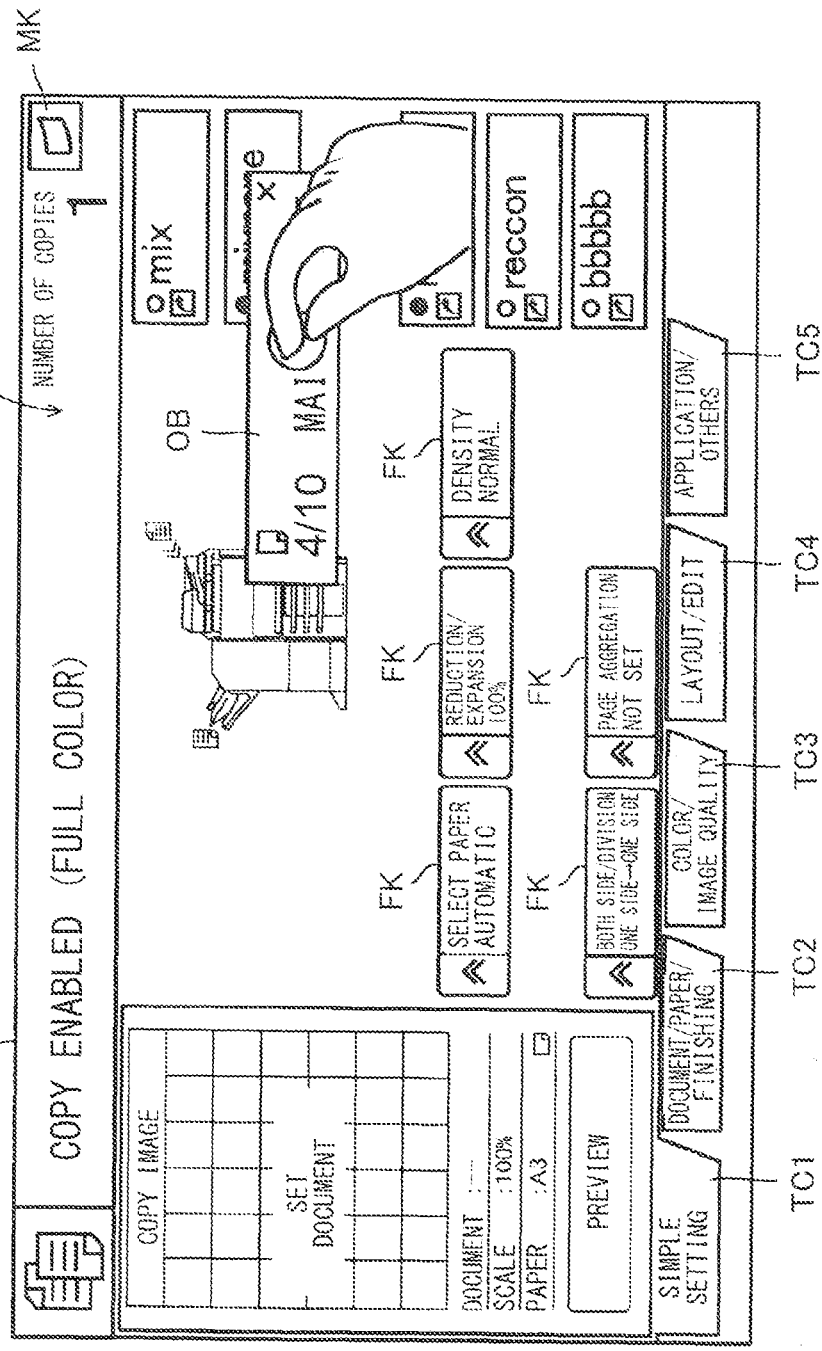
FIG. 12 is a diagram illustrating an operation for transferring an object and a screen displayed upon the operation, on the display input device of the image forming apparatus shown in FIG. 1.

In order to transfer the object OB, as shown in FIGS. 11 and 12, a user touches two points at a display position of the object OB to be transferred, on the touch panel portion 11, and performs an operation of varying the interval between the two points while keeping touching the two points (for example, an operation of narrowing the interval between the two points while keeping touching the two points). This operation is an operation for determining the object OB to be transferred. That is, after two points are touched at a display position of the object OB, when an operation of varying the interval between the two points while keeping touching the two points is performed, the touch panel portion 11 accepts that the object OB displayed at the touched position has been determined as a transfer target. Thus, the user can determine the object OB to be transferred with a simple operation, whereby convenience for the user is enhanced. In addition, it becomes possible to easily realize differentiation from another processing using two-point touching on the touch panel portion 11 as a trigger (processing other than the processing of determining the object OB to be transferred). It is noted that in FIGS. 11 and 12, an outlined circle mark indicates a touched position, and an outlined arrow mark indicates the movement direction of the touched position. In addition, also in the drawings referred to in the description later, an outlined circle mark indicates a touched position, and an outlined arrow mark indicates the movement direction of the touched position.

After the two points are touched at the display position of the object OB on the touch panel portion 11, when the operation of varying the interval between the two points is performed, the display control portion 15 determines the object OB displayed at the touched position, as a transfer target. Thereafter, the display control portion 15 counts time that has elapsed since the object OB to be transferred is determined. Then, after the object OB to be transferred is determined, at the time when a predetermined time set in advance has elapsed while the two points keep being touched on the touch panel portion 11, the display control portion 15 causes the liquid crystal display portion 12 to display transfer destination information A indicating a transfer destination candidate that can be a transfer destination of the object OB to be transferred (see FIGS. 13 and 14). Thus, it becomes possible to easily realize differentiation from another processing using two-point touching on the touch panel portion 11 as a trigger (processing other than the processing of displaying the transfer destination information A). That is, the display control portion 15 shifts to the object transfer mode. For example, the transfer destination candidate that can be a transfer destination of the object OB to be transferred is the setting screen of each function.

Figure 13:
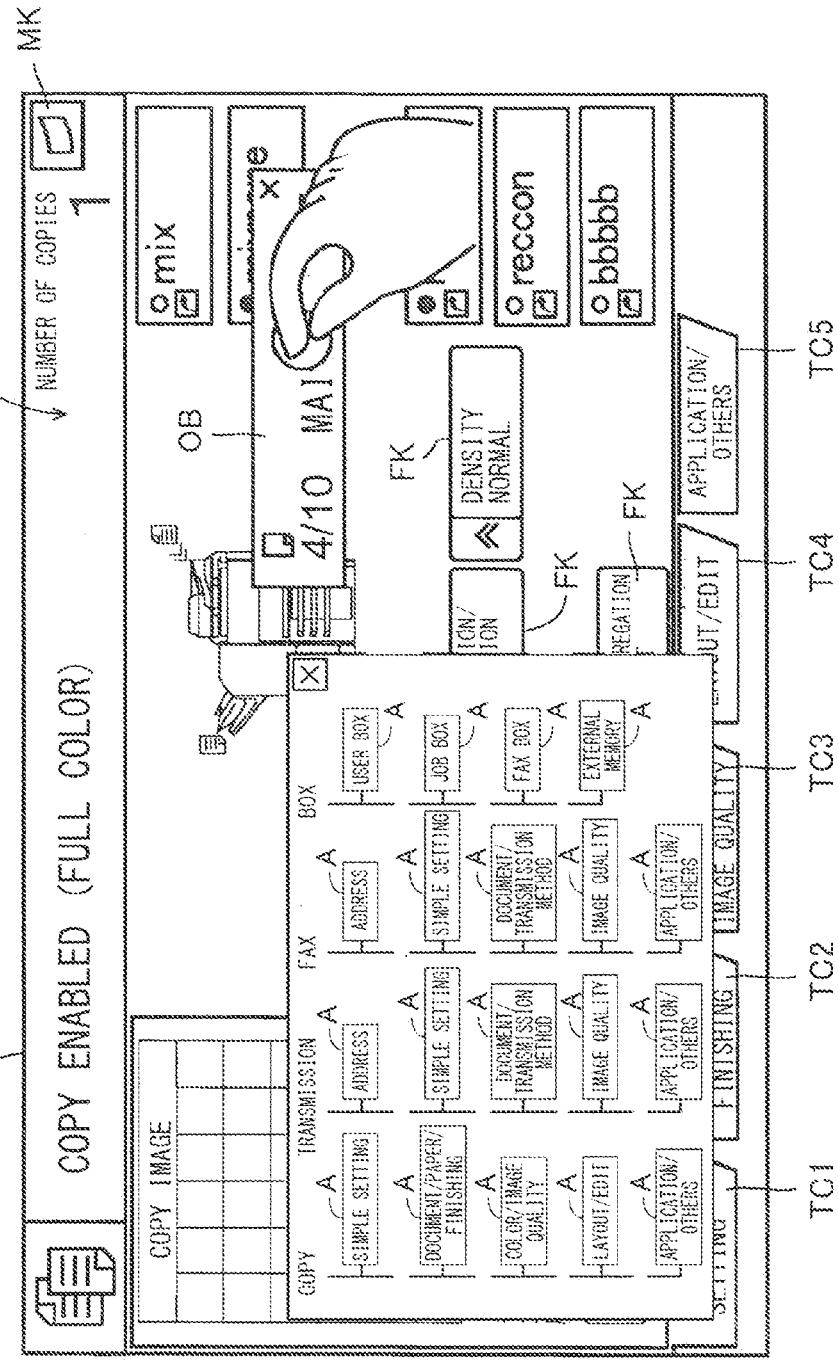
FIG. 13 is a diagram illustrating an operation for transferring an object and a screen displayed upon the operation, on the display input device of the image forming apparatus shown in FIG. 1.
Figure 14:
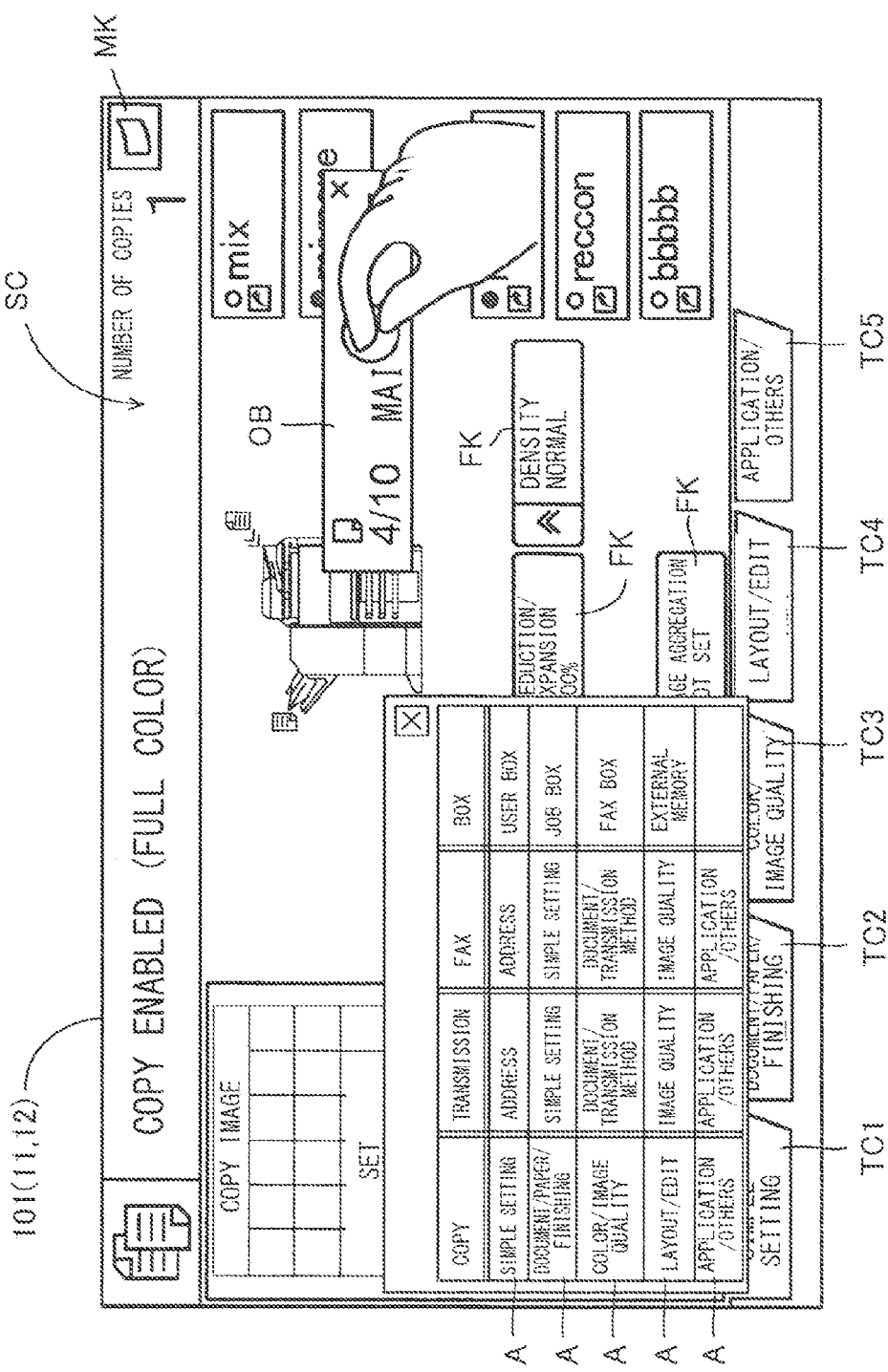
FIG. 14 is a diagram illustrating an operation for transferring an object and a screen displayed upon the operation, on the display input device of the image forming apparatus shown in FIG. 1.

Here, there are a plurality of setting screens that can be a transfer destination of the object OB to be transferred. Therefore, the liquid crystal display portion 12 displays, as a list, a plurality of pieces of transfer destination information A respectively indicating the plurality of setting screens that can be a transfer destination. Thus, the user can recognize all the transfer destination candidates that can be a transfer destination, whereby convenience for the user is enhanced. For example, as shown in FIG. 13, the liquid crystal display portion 12 displays the plurality of pieces of transfer destination information A on a function by function basis in a tree-like fashion. Alternatively, as shown in FIG. 14, the liquid crystal display portion 12 displays the plurality of pieces of transfer destination information A sorted on a table on a function by function basis.

Thus, a user can recognize the setting screens that can be a transfer destination. Thereafter, the user performs an operation (object transfer operation) for determining a transfer destination from the plurality of setting screens that can be a transfer destination.

Figure 15:
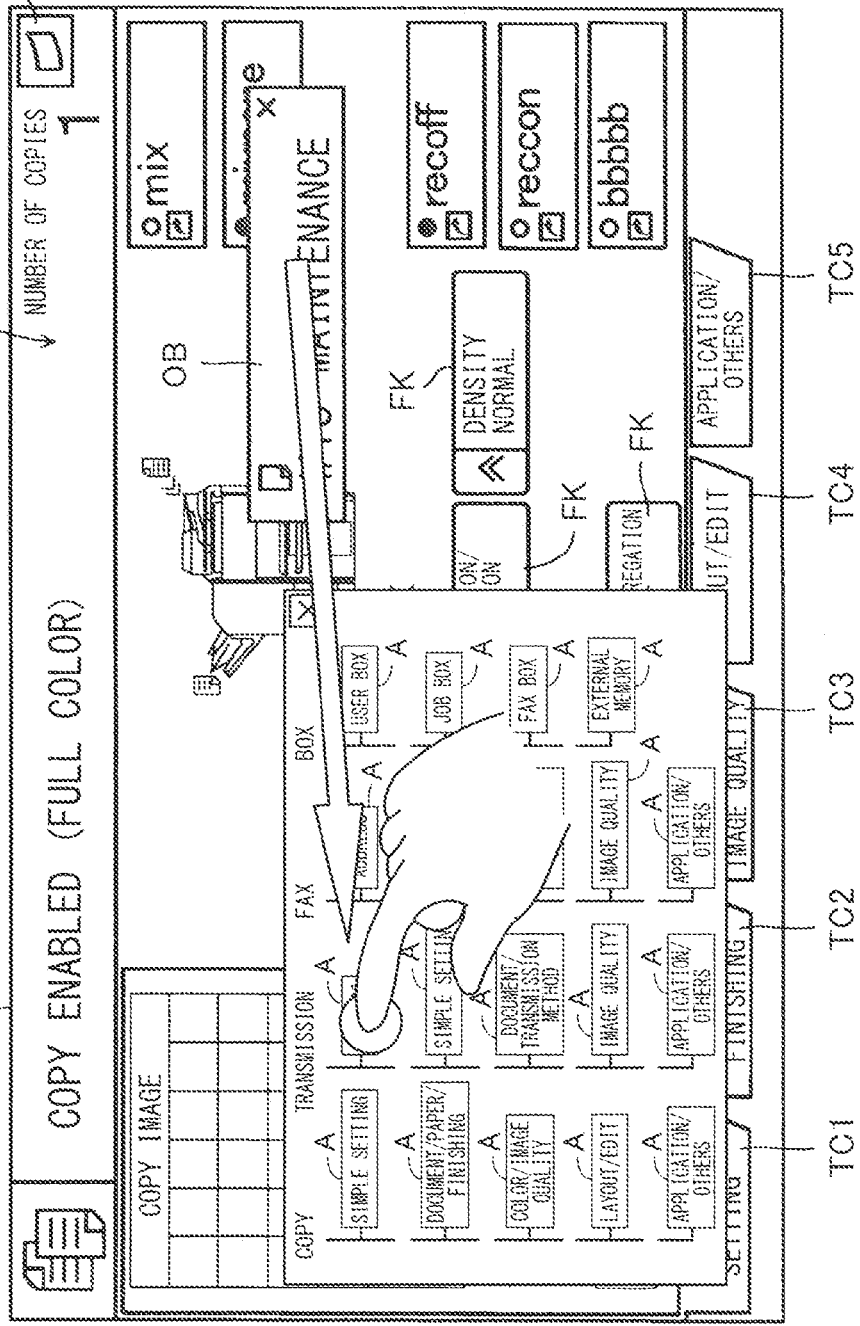
FIG. 15 is a diagram illustrating an operation for transferring an object and a screen displayed upon the operation, on the display input device of the image forming apparatus shown in FIG. 1.

For example, after the transfer destination information A is displayed on the liquid crystal display portion 12, as shown in FIG. 15, when a user has performed an operation of, while keeping touching one or more points (for example, one point) at a display position of the object OB to be transferred, moving the touched position to a display position of the transfer destination information A and releasing the touched state, the display control portion 15 determines that the touch panel portion 11 has accepted the object transfer operation. Thereafter, the display control portion 15 determines, as a transfer destination, a setting screen corresponding to a piece of the transfer destination information A displayed at the last touched position. Thus, a user can determine a transfer destination with a simple operation, whereby convenience for the user is enhanced.

Figure 16:
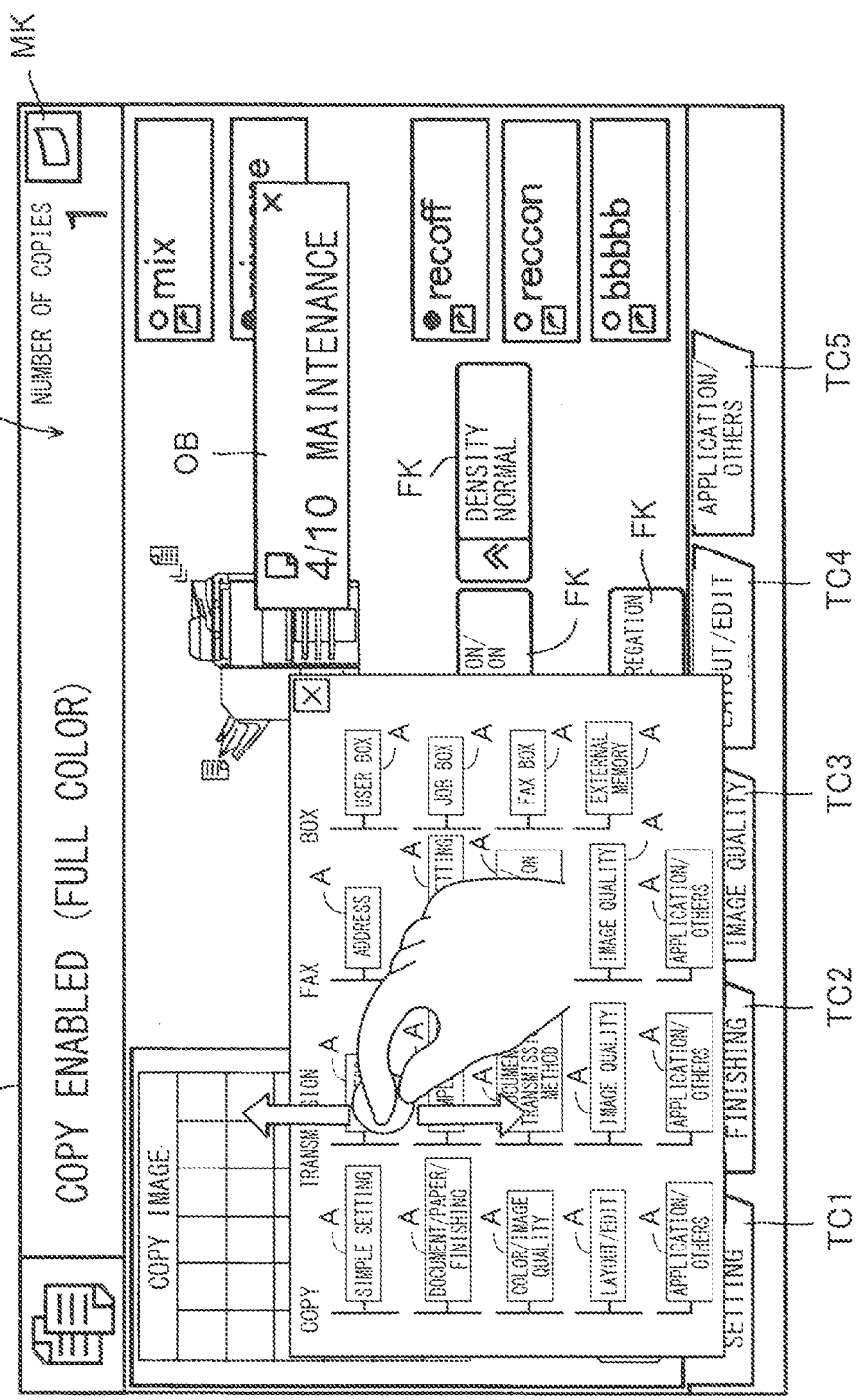
FIG. 16 is a diagram illustrating an operation for transferring an object and a screen displayed upon the operation, on the display input device of the image forming apparatus shown in FIG. 1.

Alternatively, after the transfer destination information A is displayed on the liquid crystal display portion 12, as shown in FIG. 16, when a user has performed an operation of, after releasing the touched state at the display position of the object OB, touching the display position of the transfer destination information A and then releasing the touched state (for example, an operation of touching two points, broadening the interval between the two touched points, and then releasing the touched state), the display control portion 15 determines that the touch panel portion 11 has accepted the object movement operation. Thereafter, the display control portion 15 determines, as a transfer destination, a setting screen corresponding to a piece of the transfer destination information A displayed at the last touched position. Thus, a user can determine a transfer destination with a simple operation, whereby convenience for the user is enhanced.

Figure 17:
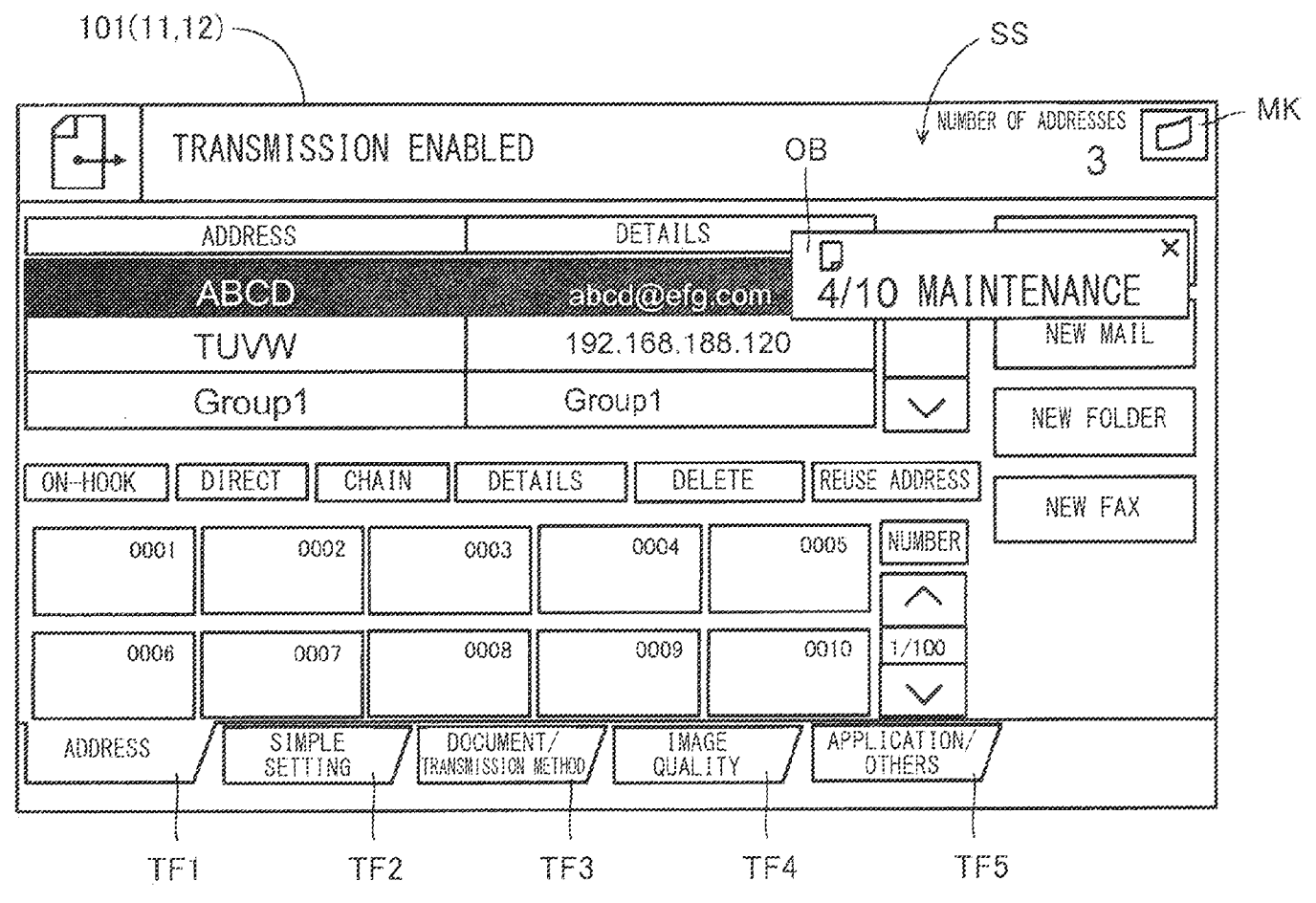

Then, the display control portion 15 updates information about the display location of the object OB. For example, it is assumed that the setting screen SS of the transmission (scan) function shown in FIG. 6 has been determined as a transfer destination. In this case, when the liquid crystal display portion 12 is instructed to display the setting screen SS of the transmission (scan) function, as shown in FIG. 17, the liquid crystal display portion 12 displays the object OB so as to be overlaid on the setting screen SS.

Here, a user may desire to transfer (copy and paste) a duplicate of the object OB to be transferred while leaving the object OB at the original position, or may desire to cut and transfer (cut and paste) the object OB to be transferred. Therefore, for example, when the touch panel portion 11 has accepted the operation shown in FIG. 15, the display control portion 15 determines that a copy-and-paste operation has been accepted, and when the touch panel portion 11 has accepted the operation shown in FIG. 16, the display control portion 15 determines that a cut-and-paste operation has been accepted.

It is noted that, after the object OB to be transferred is determined, if the predetermined time has not elapsed while the two touched points keep being touched on the touch panel portion 11, the liquid crystal display portion 12 does not display the transfer destination information A. Then, after the object OB to be transferred is determined, when a user has performed an operation of releasing the touched state at the display position of the object OB to be transferred before the predetermined time elapses, touching a different position from the display position of the object OB to be transferred on the same screen, and then releasing the touched state, the touch panel portion 11 accepts that the last touched position has been determined as a movement destination of the object OB to be transferred. Thus, the user can also move the object OB on the same screen, whereby convenience for the user is enhanced.

Figure 18:
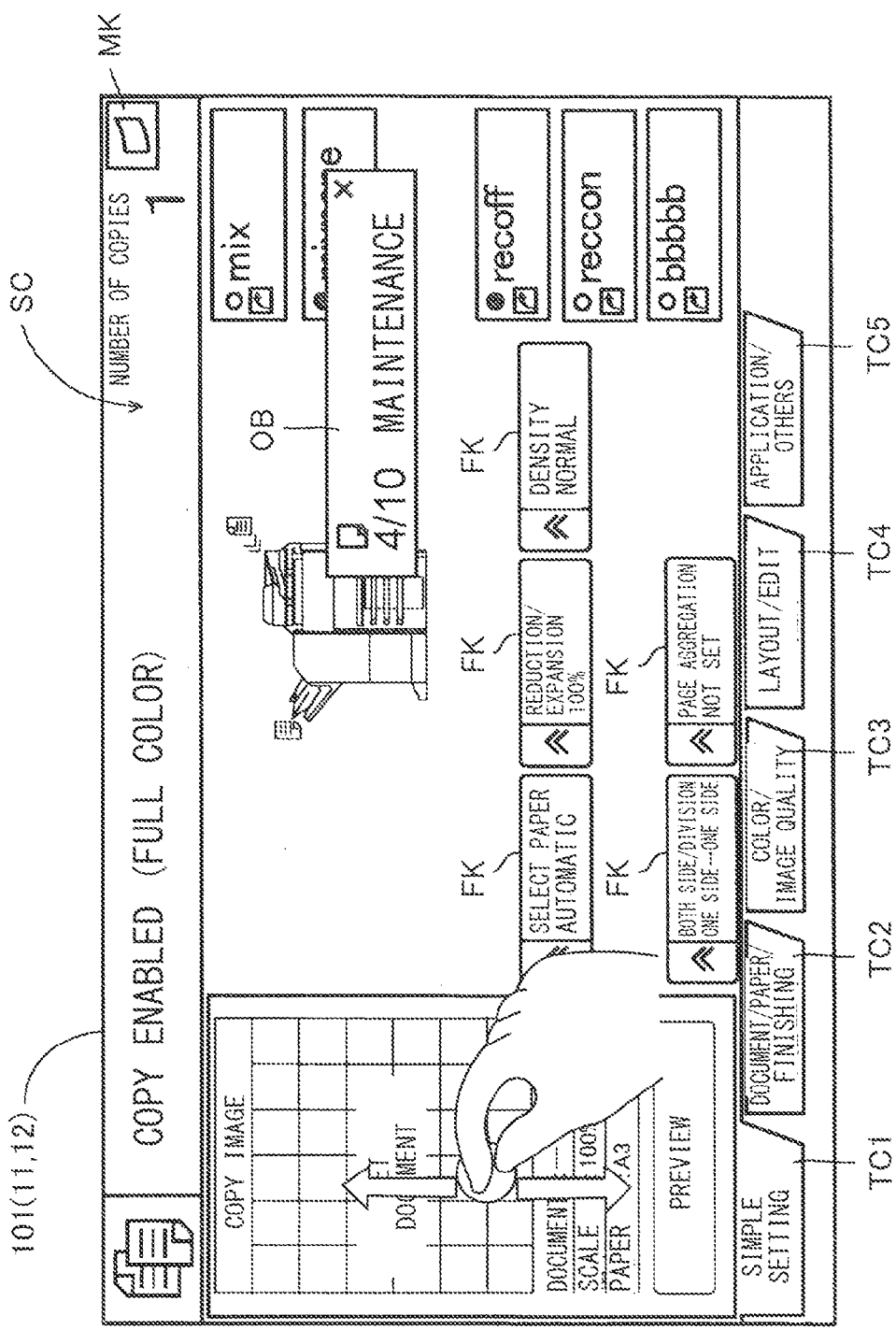
FIG. 18 is a diagram illustrating an operation for transferring an object and a screen displayed upon the operation, on the display input device of the image forming apparatus shown in FIG. 1.
Figure 19:
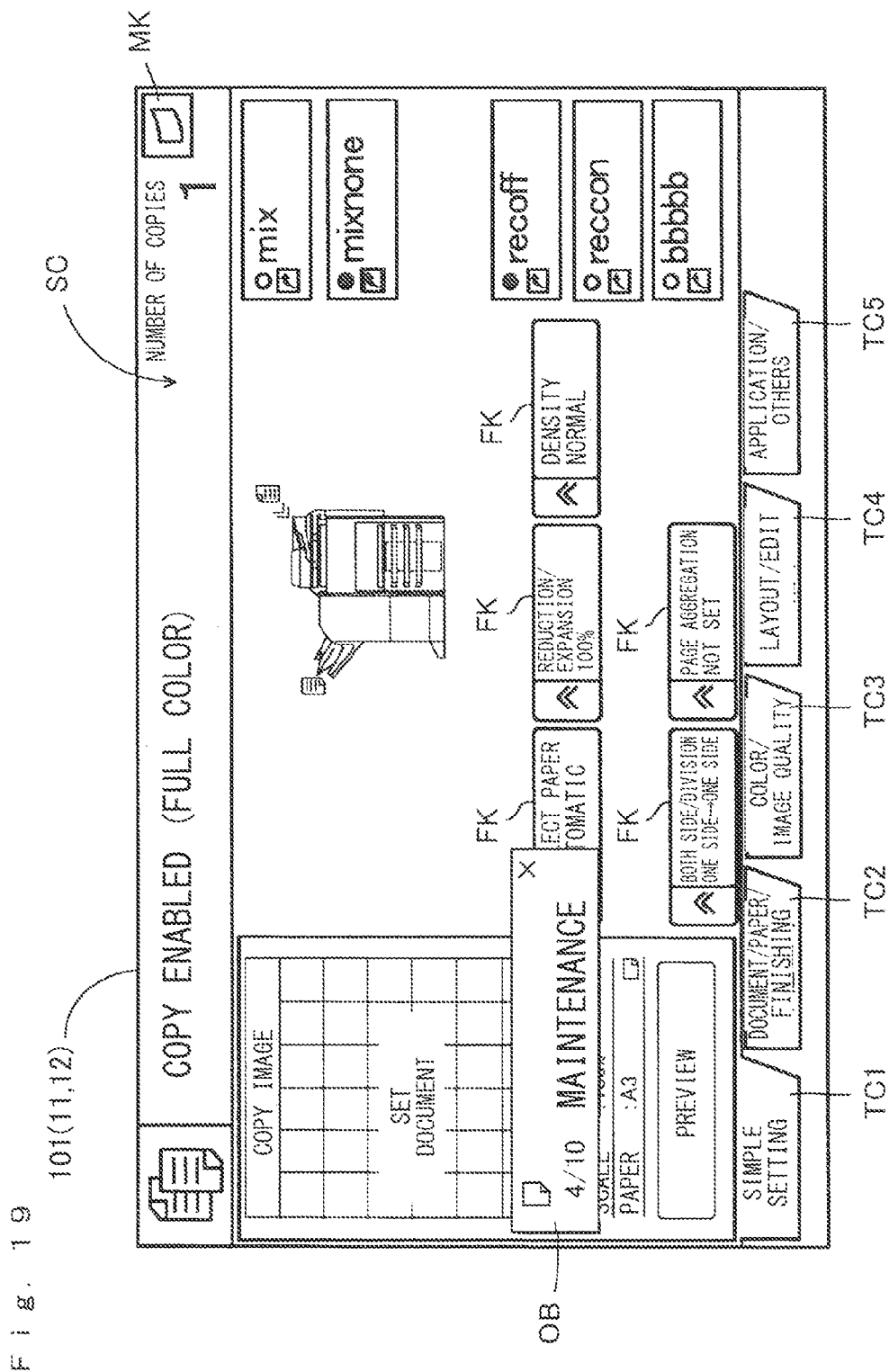
FIG. 19 is a diagram illustrating an operation for transferring an object and a screen displayed upon the operation, on the display input device of the image forming apparatus shown in FIG. 1.

For example, after the operation shown in FIG. 12 is performed (the object OB to be transferred is determined), it is assumed that the touched state at the display position of the object OB to be transferred has been released before the predetermined time elapses. Thereafter, as shown in FIG. 18, when a user has performed an operation of touching a different position from the display position of the object OB to be transferred on the same screen and then releasing the touched state (for example, an operation of touching two points, broadening the interval between the two touched points, and then releasing the touched state), the display control portion 15 determines the last touched position on the same screen as a movement destination of the object OB to be transferred. That is, as shown in FIG. 19, the liquid crystal display portion 12 moves the object OB on the same screen.

[Flow of Process for Transferring Object]

Hereinafter, with reference to flowcharts shown in FIGS. 20 and 21, the flow of a process for transferring an object provided on a setting screen will be described.

Figure 20:
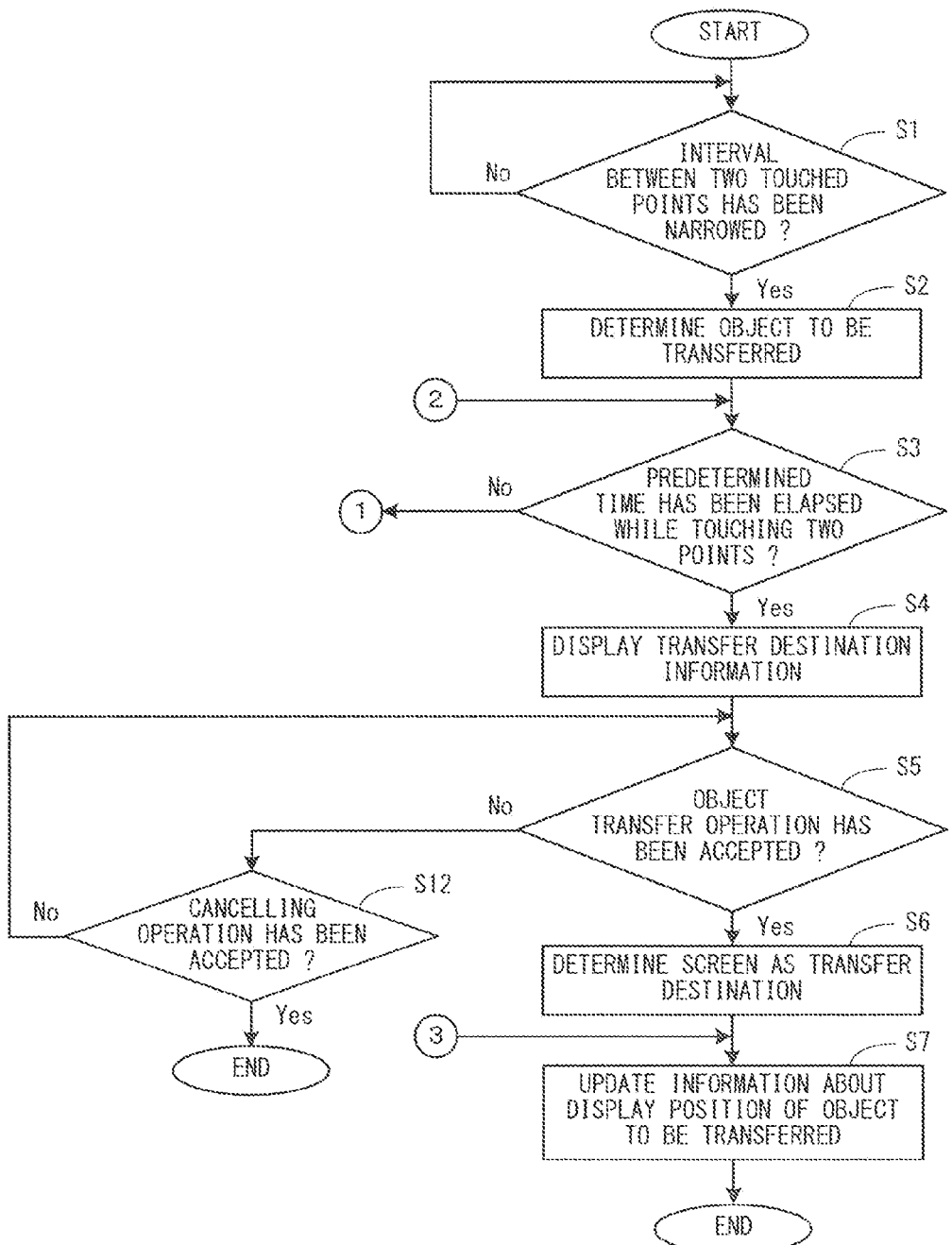
FIG. 20 is a flowchart for explaining an operation for transferring an object on the display input device of the image forming apparatus shown in FIG. 1.
Figure 21:
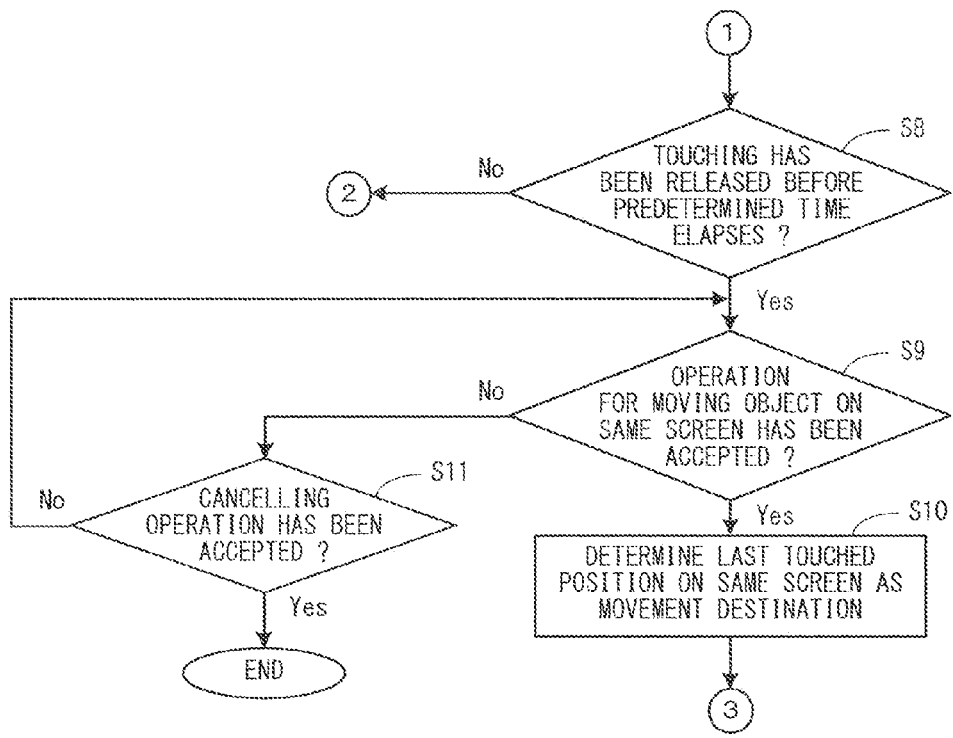
FIG. 21 is a flowchart for explaining an operation for transferring an object on the display input device of the image forming apparatus shown in FIG. 1.

First, at the start of the flowchart in FIG. 20, a setting screen on which an object OB is provided is displayed on the liquid crystal display portion 12. Then, while the setting screen on which the object OB is provided is displayed on the liquid crystal display portion 12, when the touch panel portion 11 has accepted an operation of touching two points at a display position of the object OB, the flowchart in FIG. 20 is started.

In step 51, the display control portion 15 determines whether or not, after the two points are touched at the display position of the object OB on the touch panel portion 11, an operation of narrowing (varying) the interval between the two points while keeping touching the two points has been performed. As a result of the determination, if the operation of narrowing the interval between the two touched points has been performed, the process proceeds to step S2, and if the operation of narrowing the interval between the two touched points has not been performed, the determination in step 51 is repeated (the setting screen on which the object OB is provided continues to be displayed).

In step S2, the display control portion 15 determines the object OB displayed at the touched position as a transfer target. In step S3, the display control portion 15 determines whether or not the predetermined time has elapsed while the two points keep being touched on the touch panel portion 11 since the object OB to be transferred is determined. As a result of the determination, if the predetermined time has elapsed while the two points keep being touched on the touch panel portion 11, the process proceeds to step S4.

In step S4, the display control portion 15 displays transfer destination information A indicating setting screens (transfer destination candidates) that can be a transfer destination. In step S5, the display control portion 15 determines whether or not the touch panel portion 11 has accepted an object transfer operation. As a result of the determination, if the touch panel portion 11 has accepted an object transfer operation, the process proceeds to step S6.

In step S6, the display control portion 15 determines, as a transfer destination, a setting screen corresponding to a piece of the transfer destination information A displayed at the last touched position (the position having been touched when the touched state is released). Then, in step S7, the display control portion 15 updates information about the display location of the object OB to be transferred.

It is noted that in step S3, if the predetermined time has not elapsed while the two points keep being touched on the touch panel portion 11, the process proceeds to step S8. In step S8, the display control portion 15 determines whether or not the touched state at the display position of the object OB to be transferred has been released before the predetermined time elapses. As a result of the determination, if the touched state has been released, the process proceeds to step S9, and if the touched state has not been released, the process proceeds to step S3.

In step S9, the display control portion 15 determines whether or not an operation of touching a different position from the display position of the object OB to be transferred on the same screen and then releasing the touched state (that is, an operation of moving the object OB on the same screen) has been performed on the touch panel portion 11. As a result of the determination, if the touch panel portion 11 has accepted this operation, the process proceeds to step S10. Then, in step S10, the display control portion 15 determines the last touched position (the position having been touched when the touched state is released) on the same screen as a movement destination of the object OB to be transferred. Thereafter, the process proceeds to step S7.

On the other hand, in step S9, if the touch panel portion 11 has not accepted the operation, the process proceeds to step S11. In step S11, the display control portion 15 determines whether or not a cancelling operation for cancelling transfer of the object OB has been accepted. It is noted that the cancelling operation is, for example, an operation of touching the display position of the object OB to be transferred on the touch panel portion 11. Alternatively, also when a reset key 17

(see FIG. 2) which is one of the hardware keys provided on the operation panel 101 has been pressed, the display control portion 15 can cancel transfer of the object OB. If such a cancelling operation has been accepted, the process is ended without transferring the object OB. On the other hand, if the cancelling operation has not been accepted, the process proceeds to step S9.

In addition, in step S5, if the touch panel portion 11 has not accepted an object transfer operation, the process proceeds to step S12. In step S12, the display control portion 15 determines whether or not a cancelling operation of cancelling transfer of the object OB has been accepted. As a result of the determination, if the cancelling operation has been accepted, the process is ended without transferring the object OB. On the other hand, if the cancelling operation has not been accepted, the process proceeds to step S5.

In the present embodiment, as described above, while the liquid crystal display portion 12 (display portion) is displaying a setting screen (screen) on which an object OB is provided, when a user has performed an operation of touching two points on the touch panel portion 11, the liquid crystal display portion 12 displays transfer destination information A indicating transfer destination candidates that can be a transfer destination of the object OB. In addition, when a user has performed an object transfer operation including an operation of touching a display position of the transfer destination information A and then releasing the touched state, the touch panel portion 11 accepts that a transfer destination candidate corresponding to a piece of the transfer destination information A displayed at the last touched position has been determined as an actual transfer destination of the object OB. Thus, in order to transfer an object OB, after touching two points on the touch panel portion 11 (the liquid crystal display portion 12 has displayed the transfer destination information A indicating transfer destination candidates that can be a transfer destination of the object OB), a user only needs to touch a display position of a piece of the transfer destination information A indicating a desired transfer destination on the touch panel portion 11, and does not need to go to the trouble of displaying the desired transfer destination (for example, a screen other than the current display screen), thus reducing the number of operations. As a result, upon the operation of transferring an object OB displayed on the liquid crystal display portion 12, a burden on a user can be reduced, and the operability can be improved.

It is to be understood that the embodiments herein are illustrative and not restrictive, since the scope of this disclosure is defined by the appended claims rather than by the description preceding them, and all changes that fall within metes and bounds of the claims, or equivalence of such metes and bounds thereof are therefore intended to be embraced by the claims.

For example, in the above configuration, a file icon representing image data stored in a certain box may be an object to be transferred. In this case, a folder icon having a hierarchic structure, which is an object representing a box, may be displayed as transfer destination information.

The invention claimed is:
1. A multifunctional peripheral, comprising:
    a display input device including:
        a display portion that displays a screen on which an object is provided, the object being a graphical element displayed on the display portion of the multifunctional peripheral that can be associated with at least one of the plurality of functions of the multifunctional peripheral; and
        a touch panel portion that is provided on the display portion and detects a plurality of touched positions that a user is touching, wherein
    the screen is a setting screen on which a plurality of tab keys respectively associated with a plurality of setting items related to a designated function of the plurality of functions are displayed, and accepts a setting instruction for a setting item associated with a display position of a tab key designated from among the plurality of tab keys,
    the display portion, while displaying the screen on which the object is provided, when an operation of touching two points on the touch panel portion has been performed, displays the setting item as transfer destination information indicating a transfer destination candidate that can be a transfer destination of the object,
    the touch panel portion, when an object transfer operation including an operation of touching a display position of the transfer destination information and then releasing the touched state has been performed, accepts that the transfer destination candidate corresponding to the transfer destination information displayed at a last touched position has been determined as an actual transfer destination of the object,
    the touch panel portion, when an operation of touching two points at a display position of the object and varying an interval between the two points while keeping touching the two points has been performed, accepts that the object displayed at the touched position has been determined to be transferred,
    the display portion displays the transfer destination information at a time when a predetermined time set in advance has elapsed while the two points keep being touched on the touch panel portion since the object to be transferred is determined, and when a touched state at the display position of the object to be transferred has been released before the predetermined time elapses, accepts an operation for determining a movement destination of the object to be transferred on the same screen, and moves the object to be transferred to the movement destination on the same screen,
    the display portion, if there are a plurality of transfer destination candidates that can be a transfer destination of the object to be transferred, displays, as a list, a plurality of pieces of the transfer destination information respectively indicating the plurality of transfer destination candidates that can be the transfer destination, and
    the touch panel portion, after the display portion has displayed the transfer destination information, when an object transfer operation of, while keeping touching one or more points at the display position of the object to be transferred, moving the touched position to a display position of the transfer destination information and then releasing the touched state has been performed, accepts that the transfer destination candidate corresponding to the transfer destination information displayed at the last touched position has been determined as an actual transfer destination of the object.

2. The multifunctional peripheral according to claim 1, wherein
    the display portion, when the transfer destination candidates include a plurality of setting items related to a plurality of types of functions, displays, as a list, the transfer destination candidates on a function by function basis in a tree-like fashion.

3. A multifunctional peripheral, comprising:
a display input device including:
- a display portion that displays a screen on which an object is provided, the object being a graphical element displayed on the display portion of the multifunctional peripheral that can be associated with at least one of a plurality of functions of the multifunctional peripheral; and
- a touch panel portion that is provided on the display portion and detects a plurality of touched positions that a user is touching, wherein
- the screen is a setting screen on which a plurality of tab keys respectively associated with a plurality of setting items related to a designated function of the plurality of functions are displayed, and accepts a setting instruction for a setting item associated with a display position of a tab key designated from among the plurality of tab keys,
- the display portion, while displaying the screen on which the object is provided, when an operation of touching two points on the touch panel portion has been performed, displays the setting item as transfer destination information indicating a transfer destination candidate that can be a transfer destination of the object,
- the touch panel portion, when an object transfer operation including an operation of touching a display position of the transfer destination information and then releasing the touched state has been performed, accepts that the transfer destination candidate corresponding to the transfer destination information displayed at a last touched position has been determined as an actual transfer destination of the object,
- the touch panel portion, when an operation of touching two points at a display position of the object and varying an interval between the two points while keeping touching the two points has been performed, accepts that the object displayed at the touched position has been determined to be transferred,
- the display portion displays the transfer destination information at a time when a predetermined time set in advance has elapsed while the two points keep being touched on the touch panel portion since the object to be transferred is determined, and when a touched state at the display position of the object to be transferred has been released before the predetermined time elapses, accepts an operation for determining a movement destination of the object to be transferred on the same screen, and moves the object to be transferred to the movement destination on the same screen,
- the display portion, if there are a plurality of transfer destination candidates that can be a transfer destination of the object to be transferred, displays, as a list, a plurality of pieces of the transfer destination information respectively indicating the plurality of transfer destination candidates that can be the transfer destination, and
- the touch panel portion, after the display portion has displayed the transfer destination information, when an object transfer operation of releasing the touched state at the display position of the object, touching a display position of the transfer destination information, and then releasing the touched state, has been performed, accepts that the transfer destination candidate corresponding to the transfer destination information displayed at the last touched position has been determined as an actual transfer destination of the object.

4. The multifunctional peripheral according to claim 3, wherein
the display portion, when the transfer destination candidates include a plurality of setting items related to a plurality of types of functions, displays, as a list, the transfer destination candidates on a function by function basis in a tree-like fashion.

5. An image forming apparatus comprising:
an image forming portion configured to form a toner image on a paper sheet;
an image fixing portion configured to fix the toner image on the paper sheet; and
a display input device including:
- a display portion that displays a screen on which an object is provided, the object being a graphical element displayed on the display portion of the image forming apparatus that can be associated with at least one of a plurality of functions of the image forming apparatus; and
- a touch panel portion that is provided on the display portion and detects a plurality of touched positions that a user is touching, wherein
- the screen is a setting screen on which a plurality of tab keys respectively associated with a plurality of setting items related to a designated function of the plurality of functions are displayed, and accepts a setting instruction for a setting item associated with a display position of a tab key designated from among the plurality of tab keys,
- the display portion, while displaying the screen on which the object is provided, when an operation of touching two points on the touch panel portion has been performed, displays the setting item as transfer destination information indicating a transfer destination candidate that can be a transfer destination of the object,
- the touch panel portion, when an object transfer operation including an operation of touching a display position of the transfer destination information and then releasing the touched state has been performed, accepts that the transfer destination candidate corresponding to the transfer destination information displayed at a last touched position has been determined as an actual transfer destination of the object,
- the touch panel portion, when an operation of touching two points at a display position of the object and varying an interval between the two points while keeping touching the two points has been performed, accepts that the object displayed at the touched position has been determined to be transferred,
- the display portion displays the transfer destination information at a time when a predetermined time set in advance has elapsed while the two points keep being touched on the touch panel portion since the object to be transferred is determined, and when a touched state at the display position of the object to be transferred has been released before the predetermined time elapses, accepts an operation for determining a movement destination of the object to be transferred on the same screen, and moves the object to be transferred to the movement destination on the same screen, the display portion, if there are a plurality of transfer destination candidates that can be a transfer destination of the object to be transferred, displays, as a list, a plurality of pieces of the transfer destination information respectively indicating the plurality of transfer destination candidates that can be the transfer destination, and the touch panel portion, after the display portion has displayed the transfer destination information, when an object transfer operation of, while keeping touching one or more points at the display position of the object to be transferred, moving the touched position to a display position of the transfer destination information and then releasing the touched state has been performed, accepts that the transfer destination candidate corresponding to the transfer destination information displayed at the last touched position has been determined as an actual transfer destination of the object.

6. The image forming apparatus according to claim 5, wherein the display portion, when the transfer destination candidates include a plurality of setting items related to a plurality of types of functions, displays, as a list, the transfer destination candidates on a function by function basis in a tree-like fashion.

* * * * *